(12) United States Patent
Mori et al.

(10) Patent No.: US 7,797,201 B2
(45) Date of Patent: Sep. 14, 2010

(54) METHOD AND SYSTEM FOR RECEIVING AND HANDLING ORDERS FOR COMMODITIES

(75) Inventors: Hideyuki Mori, Koganei (JP); Masao Kaneko, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 1167 days.

(21) Appl. No.: 11/418,092

(22) Filed: May 5, 2006

(65) Prior Publication Data
US 2006/0212365 A1  Sep. 21, 2006

Related U.S. Application Data

(62) Division of application No. 10/004,790, filed on Dec. 7, 2001, now abandoned.

(30) Foreign Application Priority Data

Dec. 8, 2000  (JP) ............... 2000-374376

(51) Int. Cl.
*G06Q 30/00* (2006.01)
*G06F 17/30* (2006.01)
(52) U.S. Cl. ............... 705/26; 705/27; 705/308
(58) Field of Classification Search ............ 705/1, 705/26–27, 308, 330–348
See application file for complete search history.

(56) References Cited

U.S. PATENT DOCUMENTS

| | | | |
|---|---|---|---|
| 5,305,199 | A | 4/1994 | LoBiondo et al. |
| 5,870,717 | A | 2/1999 | Wiecha |
| 5,960,402 | A * | 9/1999 | Embutsu et al. ............ 705/308 |
| 6,085,170 | A | 7/2000 | Tsukuda |
| 6,141,507 | A | 10/2000 | Sawada |
| 6,321,221 | B1 | 11/2001 | Bieganski |
| 6,405,178 | B1 | 6/2002 | Manchala et al. |
| 6,882,269 | B2 | 4/2005 | Moreno |
| 7,010,502 | B1 | 3/2006 | Hoshizawa et al. |
| 7,130,814 | B1 * | 10/2006 | Szabo et al. ............ 705/26 |
| 7,426,492 | B1 * | 9/2008 | Bishop et al. ............ 705/39 |
| 2001/0037259 | A1 | 11/2001 | Sharma et al. |
| 2004/0089482 | A1 * | 5/2004 | Ramsden et al. ............ 177/1 |

FOREIGN PATENT DOCUMENTS

JP   11-250129 A   9/1999

(Continued)

OTHER PUBLICATIONS www.craigslist.com. Jun. 19, 2000. [recovered from www.Archive.org].*

(Continued)

*Primary Examiner*—William J Allen
(74) *Attorney, Agent, or Firm*—Morrison & Foerster LLP

(57) ABSTRACT

An order-reception system has: an order-reception subsystem which receives, from a customer, customer order information including order-reception information and/or support request information and customer information; a business management subsystem having a customer-information database storing the customer information including information regarding a price of a commodity purchased frequently by the customer, and a cost of a support requested frequently by the customer, the price and the cost set by a seller; an order-entry subsystem which performs an order-reception processing based on the customer order information; and a delivery subsystem which arranges delivery of the commodity and providing of the support.

4 Claims, 27 Drawing Sheets

FOREIGN PATENT DOCUMENTS

KR    1020020014083 A    2/2002

OTHER PUBLICATIONS

New Jersey waste paper vendors win state contract. (Alpine Paper Recycling Co.) PR Newswire, p. 0809NY055, Aug. 9, 1989.*

Nikkei BP, Inc. (1999). "Network strategy Research KOKUYO," *Nikkei Communication* 306:140-144.

Sendenkaigi Co. Ltd. (2000) "Confidentiality Preservation and Old Paper Recycling/Reclaiming Both Work; Unique Recycling System Has Been Built Up," *Environmental Device* 30-31.

Vertical Systems Co., Ltd. (2000) "Hot MRO Market" *In e-Company Super Manual* pp. 40-41.

Japanese Office Action mailed on Jan. 30, 2007 for Japanese Patent Application No. JP-2000-374376. 2 pages.

"Clarify Delivers First e-Business Solution That Puts CRM Into the Hands of Online Customers," PR Newswire, New York, Feb. 28, 2000.

Mori, H. et al., U.S. Office Action mailed on Nov. 30, 2004, directed to U.S. Appl. No. 10/004,790; 22 pages.

Mori, H. et al., U.S. Office Action mailed on Jun. 29, 2005 directed to U.S. Appl. No. 10/004,790; 22 pages.

Mori, H. et al., U.S. Office Action mailed on Dec. 16, 2005, directed to U.S. Appl. No. 10/004,790; 17 pages.

Mori, H. et al., U.S. Office Action mailed on Jun. 20, 2006, directed to U.S. Appl. No. 10/004,790; 18 pages.

Mori, H. et al., U.S. Office Action mailed on Jan. 4, 2007, directed to U.S. Appl. No. 10/004,790; 18 pages.

Mori, H. et al., U.S. Office Action mailed on Jun. 29, 2007, directed to U.S. Appl. No. 10/004,790; 13 pages.

* cited by examiner

FIG. 16A

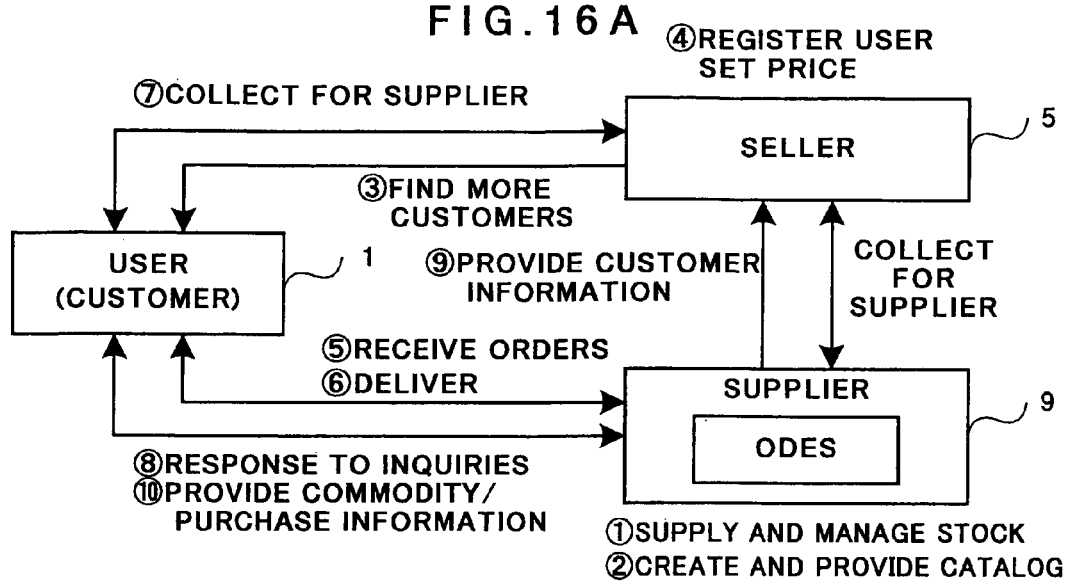

④REGISTER USER SET PRICE
⑦COLLECT FOR SUPPLIER
③FIND MORE CUSTOMERS
⑨PROVIDE CUSTOMER INFORMATION
COLLECT FOR SUPPLIER
⑤RECEIVE ORDERS
⑥DELIVER
⑧RESPONSE TO INQUIRIES
⑩PROVIDE COMMODITY/ PURCHASE INFORMATION
①SUPPLY AND MANAGE STOCK
②CREATE AND PROVIDE CATALOG

USER (CUSTOMER)
SELLER
SUPPLIER
ODES

FIG. 16B

|  | SELLER | SUPPLIER (ODES) |
|---|---|---|
| ①SUPPLY AND MANAGE STOCK | — | * |
| ②CREATE AND PROVIDE CATALOG | — | * |
| ③SALES (FIND MORE CUSTOMERS) | * | — |
| ④REGISTER USER, SET PRICE | * | — |
| ⑤RECEIVE AND CONFIRM ORDERS | — | * |
| ⑥DELIVER AND CONFIRM DELIVERY | — | * |
| ⑦COLLECT FOR SUPPLIER | * | — |
| ⑧RESPONSE TO INQUIRIES | — | * |
| ⑨PROVIDE CUSTOMER INFORMATION | — | * |
| ⑩PROVIDE COMMODITY/ PURCHASE INFORMATION | — | * |

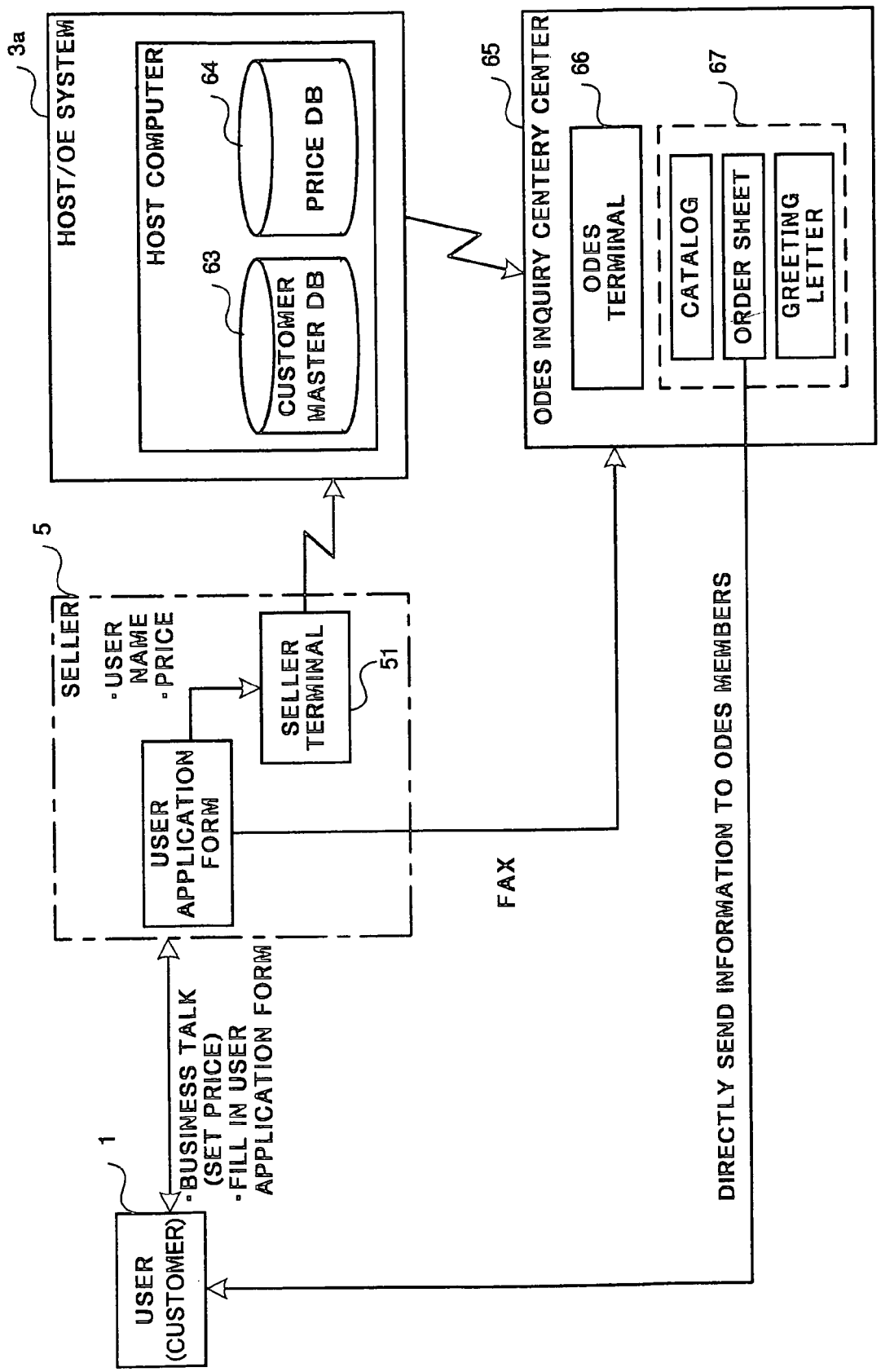

FIG.21

| ※)FILL IN BLANKS | ODES USER APPLICATION FORM |
|---|---|
| ※DATE OF APPLICATION [ ] | WE CONSENT TO ODES MEMBER AGREEMENT, APPLY FOR USING ODES SYSTEM, AND SIGN HERE |

※CUSTOMER PHONE NO. [ ]　※CUSTOMER FAX NO. [ ]　※E-MAIL ADDRESS OF ORDERING STAFF [ ]

※

| CUSTOMER COMPANY NAME | SECTION NAME |
|---|---|
| NAME OF PERSON IN CHARGE<br>SIGNAUTURE | NAME OF PERSON MAKING ORDER<br>SIGNAUTURE |
| PLACE TO DELIVER | |

(SHOULD BE FILLED IN BY SALES PERSON AFTER TALK WITH CUSTOMER)
FREQUENTLY-PURCHAED COMMODITY

| CODE NUMBER | COMMODITY NAME | PRICE / RATE(%) | CODE NUMBER | COMMODITY NAME | PRICE / RATE(%) |
|---|---|---|---|---|---|
| | | | | | |
| | | | | | |

| DESIRED DELIVERY PATTERN | ONE DAY | HALF DAY | REQUEST FOR RETURN SERVICE | YES | NO |
|---|---|---|---|---|---|

| TERMS OF PAYMENT | EVERY MONTH | PERIOD DATE |
|---|---|---|

PAYMENT METHOD　1.TRANSFER
2.BANK ACCOUNT　3.CASH
4. OTHER(　　　　　　)

MANAGEMENT ITEM
CUSTOMER CODE [ ][ ][ ][ ][ ][ ][ ][ ][ ]

| SPECIAL NOTE (DELIVERY CONDITION, ETC.) | SELLER NAME<br>STAFF IN CHARGE<br>PHONE NUMBER |
|---|---|
| | CREATED BY _____<br>APPROVED BY _____<br>INPUT BY _____ |

FIG.22

| ※)FILL IN BLANKS | ODES USER APPLICATION FORM | FOR SELLER |
|---|---|---|
| ※DATE OF APPLICATION | WE CONSENT TO ODES MEMBER AGREEMENT, APPLY FOR USING ODES SYSTEM, AND SIGN HERE | |

※CUSTOMER PHONE NO.　※CUSTOMER FAX NO.　※E-MAIL ADDRESS OF ORDERING STAFF

※

| CUSTOMER COMPANY NAME | SECTION NAME |
|---|---|
| NAME OF PERSON IN CHARGE<br><br>SIGNAUTURE | NAME OF PERSON MAKING ORDER<br><br>SIGNAUTURE |
| PLACE TO DELIVER | |

(SHOULD BE FILLED IN BY SALES PERSON AFTER TALK WITH CUSTOMER)
FREQUENTLY-PURCHAED COMMODITY

| CODE NUMBER | COMMODITY NAME | PRICE | | CODE NUMBER | COMMODITY NAME | PRICE | |
|---|---|---|---|---|---|---|---|
| | | RATE(%) | | | | RATE(%) | |
| | | | | | | | |
| | | | | | | | |

| DESIRED DELIVERY PATTERN | ONE DAY | HALF DAY | REQUEST FOR RETURN SERVICE | YES | NO |
|---|---|---|---|---|---|

| TERMS OF PAYMENT | EVERY MONTH　PERIOD DATE | CUSTOMER PROFILE WRITTEN BY SALES PERSON WRITE SELLERS BEFORE ODES |
|---|---|---|
| PAYMENT METHOD　1.TRANSFER<br>2.BANK ACCOUNT　3.CASH<br>4.OTHER(　　　　　) | | OUR TONER(　　)OTHER TONER(　　)<br>PAPER(　　　　)<br>1.OURS　2.ABC　3.XYZ　4.ELSE |

MANAGEMENT ITEM
CUSTOMER CODE ☐☐☐☐☐☐☐☐☐☐

| SPECIAL NOTE (DELIVERY CONDITION, ETC.) | SELLER NAME<br>STAFF IN CHARGE<br>PHONE NUMBER |
|---|---|
| CUSTOMER SIZE (NUMBER OF WORKERS)<br>L2(1000-)　L1(300-999)　M2(100-299)<br>M1(30-99)　S2(5-29)　S1(1-4) | CREATED BY _____<br>APPROVED BY _____<br>INPUT BY _____ |

FIG.26

| |
|---|
| SALES INFORMATION BY CUSTOMER |
| SALES INFORMATION BY DEPOT |
| INFORMATION REGARDING ORDERS BY CUSTOMER |
| SALES INFORMATION AND ACCOUNT OF TONER (ACQUIRING FROM OTHER COMPANIES) |
| PURCHASE HISTORY OF EACH CUSTOMER |
| ODES SALES AND GROSS MARGIN INFORMATION |
| SALES INFORMATION BY COMMODITY GROUP |
| INFORMATION REGARDING NUMBER OF ACCOUNTS FOR ORDERS AND REGARDING TOTAL NUMBER OF ORDERS MADE BY CUSTOMERS |
| INFORMATION REGARDING NEW SUPPLY COMMODITY (BOTH OWN COMPANY AND OTHER COMPANIES) |
| CUSTOMER CLAIMING INFORMATION |
| CUSTOMER INQUIRY INFORMATION |
| NEW MACHINE INFORMATION |
| OTHER INFORMATION |

METHOD AND SYSTEM FOR RECEIVING AND HANDLING ORDERS FOR COMMODITIES

REFERENCE TO RELATED APPLICATION

This application is a divisional of Ser. No. 10/004,790, filed Dec. 7, 2001, which claims priority to Japanese Patent Application No. 2000-374376, filed Dec. 8, 2000.

BACKGROUND OF THE INVENTION

1. Field of the Invention

The present invention relates to a method and system for receiving and handling orders for commodities and delivering the ordered commodities.

2. Description of the Related Art

In recent years, there are various needs for purchase methods, such as a one stop order, short delivery term purchase, etc. In order to meet such needs, in the field of office supply business, various companies including OA (Office Automation) supply companies and stationery companies, or domestic and foreign capital companies, compete with one another. Each of those various companies has so many kinds of commodities to be provided to users by what is so-called one stop order, so as to provide the users with the commodities of its own commodities and other companies' commodities. As a result of this, the whole sales of those companies tend to increase, and it is estimated that the market of the office supply goods in Japan will grow to $12 billion. There are various methods of receiving orders also. In addition to the facsimile or telephone ordering, there is the Internet ordering which is quite convenient. Typical example of such Internet ordering is "one-click order". In such circumstances where the above-mentioned various companies compete with one another in the field of mail-order business and where there are various methods of ordering for commodities, the customer tends to choose the office-supplier.

The mail-order business using the Internet technology is rapidly spread, along with the wide use of the Internet. Usually, in the mail-order business using the Internet, those consumers who would like to purchase commodities accesses commodities information served on a Web page on the Internet and finds the desired commodities from the commodities information.

Under the present situation of the mail-order business of stationary goods, each of those companies serves as a purchase agent (distribution business) for the consumers, and deals with personal business small, medium and large companies and the like. According to their sales method, there is prepared a catalog showing a plurality of commodities in association with their regular prices, and the actual prices of the commodities are determined upon determination between each customer and an SA (Service Assistant). Additionally, there is also another method wherein each of the companies waits for orders from the customers. Further, the catalog may show in advance "off prices" that are prices discounted from the regular prices, and each of the companies then waits for orders from the customers. In such conditions, orders received through the Internet comes to 15% to 30% of the total sales.

In the actual sales, each of the above-described companies sets a sales condition that it is necessary that the total price of each order be $100 or more, in order to avoid a decrease in the benefit rate. In addition to the stationary goods including the toner, paper, OA supplies for computers, office electronics products and the like, daily necessities are also sold through the Internet.

In consideration of the present circumstances of OA supply dealers, the number of C/V to be provided decreases, while a number of cancellations of machines contracted increases. This can be applied especially to customers with a great deal of C/V. For example, in an OA stationary dealer, according to the study of the usage context of paper for the year 1998, it is clear that more than 90% of paper for C/V 5K or higher, whose contract is being cancelled, is purchased from other companies. According to data representing the relationship between the number of machines whose contract is cancelled and the provided rate of the C/V, it is essential to sell desired paper in order to avoid the cancellation of the machines contracted. Therefore, to maintain contracts with customers while increasing the sufficiency level of the C/V, it is necessary to have alliance with a paper manufacturer.

Those requirements that consumers purchase commodities of a corresponding company in the above-described sales circumstances are: low prices for those large-scale companies; easy way to purchase commodities; delivery of a requested commodity the next day at latest; and the like. In addition to the above requirements, for those small-scale companies and personal customers, it is preferred that customers purchase commodities by "one stop order". The customers of small-scale companies purchase any commodities by one stop, while customers of relatively large-scale companies purchase a plurality of commodites from different sellers. Demands from consumers are: appropriate attitude in a case where an ordering mistake is found; urgent delivery; keeping a rich assortment of commodities in each category; collection of used items at the time when delivering a new commodities/collection of rapping materials/additional service for delivering and putting the commodities onto a specified rack, etc. That is, there tends to be various customer needs, such as (1) various manufacturer supplies by "one stop order" (to aim for reducing the cost) and short delivery term, (2) reasonable price, (3) additional service, (4) easy way to order commodities (e.g. using a facsimile or through the Web (Internet), and (5) purchase and collection of used goods for the environmental sake.

Conventionally, manufacturers (vendors) sell commodities (product items) from their assigned distributors or from their own sales section, according to a mail-order selling method without the Internet technology. For example, if the user gives an order through a telephone call or facsimile in a particular order form, data representing the order contents is sent to a corresponding distributor or its own main business management system. Upon this, the distributor or the main business management system informs the user of the delivery date. The main business management system sends order-reception information to the terminal of the O/E system (Order Entry System), and the O/E system sends an order for a particular commodity (product item) toward a manufacture section of the manufacturer or vender. For the inquiries from the user about the price of the commodity, specification of the commodity (product), a request for returning back once-purchased commodity or a request for delivering the commodity in a short delivery term, the distributor or the sales section responds. Additionally, for those inquiries regarding the delivery date, delivery time, stock information, addition or cancellation of ordered commodity, confirmation as to whether facsimile data has been received, the manufacturer or the sales section responds.

SUMMARY OF THE INVENTION

The present invention has been made in consideration of the above. It is accordingly an object of the present invention to provide a system for receiving orders for commodities and delivering the ordered commodities, and for realizing a mechanism corresponding to various customer needs and a new delivery service for providing users with commodities, and also to provide a method for receiving orders for commodities and delivering the commodities ordered, as employed in the above system.

In order to achieve the above object, according to the first aspect of the present invention, there is provided a method of receiving and handling an order from a customer using at least one computer, comprising the steps of:

receiving customer order information sent from the customer, said customer order information including customer information regarding the customer and at least one of ordering information representing contents of an order for a commodity ordered by the customer and support request information representing contents of a support request;

performing the order reception processing based on the received customer order information;

determining to deliver the commodity specified in the ordering information and to provide a support specified in the support information, based on a result of the order reception processing;

confirming whether the commodity is delivered and the support is provided; and charging a price of the commodity specified in the ordering information and a cost of the support specified in the support request information, based on the customer information including information regarding a price of each commodity purchased by the customer with high frequency and a cost of each support requested by the customer with high frequency, wherein the price and the cost are set by a seller of the commodity and support.

According to this invention, various services and prices in accordance with various customers can be realized, in response to a request therefor.

The method may further includes the steps of:

checking whether there is a stock of the commodity specified in the ordering information based on stock information;

determining a delivery date for delivering the ordered commodity; and sending order-reception confirmation information including delivery-date information representing the determined delivery date and the customer order information to the customer either in a facsimile form or e-mail form.

According to this invention, the customer can check the contents of the order, and can be aware of the delivery date. Hence, the customer should highly be satisfied with this system.

The method may further including the steps of:

storing, in a storage, Q&A information representing the contents of inquiries sent from the customer and the seller and the contents of responses to the inquiries, the inquiries regarding commodities to be sold and supports to be provided; and providing the Q&A information stored in the storage, in response to a request.

According to this invention, the customer can know the specific contents the services, and hence it is quite convenient for making orders for commodities or for requesting for services. At the same time, the service provider can know the customer needs, and can provide better services to customers based on their needs.

The method may further include the step of gathering statistical data based on the customer information and customer order information of each of a plurality of customers; and reflecting the statistical data to the Q&A information.

The support request information may include information regarding a request for collecting recyclable items including at least one of a used cartridge, a used toner container and used paper.

The method may further include the step of arranging collection of used paper, in response to a support request for collecting used paper from the customer when a used-paper collection box provided to the customer is filled with used paper.

The support request information includes information regarding a request for at least one of:

a service for delivering the commodity to a place specified by the customer;

a service for unpacking the ordered commodity at a time of delivery;

a service for collecting an empty box that the customer does not need any more;

a service for delivering commodities that are repeatedly supplied to the customer on a FIFO basis;

a service for specifying a delivery date for delivering the commodity to be delivered;

a service for urgently delivering the ordered commodity; and a service for periodically delivering a constant number of commodities specified by the customer.

The method may further include the steps of:

storing, in a storage in response to a customer registration operation of the seller, the customer information including information regarding a price of a commodity purchased by the customer with high frequency and a cost of a support requested by the customer with high frequency, wherein the price and the cost are set by the seller; and creating a purchase application form and a catalog based on the stored customer information, and providing the customer with the created application form and catalog.

The customer order information may be sent from the customer through a telephone call, via facsimile or through Internet.

In a case where the customer has made a contract of maintenance service for one of a plurality of apparatus including OA apparatuses, a delivery of the commodity is assigned to a service person who can execute the maintenance service when it is determined that to deliver the commodity specified in the ordering information, and it may be determined to execute a maintenance service based on the maintenance contract at a time of delivering the commodity, based on the customer information and customer order information.

The method may further comprise the steps of:

arranging delivery of the commodity specified in the ordering information based on the customer order information, upon determination of the delivery of the commodity specified in the ordering information and the providing of the support; and instructing a distributor to perform a support when delivering the commodity, in a case where the support is specified in the customer order information.

The method may further include the steps of:

confirming whether there is a stock of the ordered commodity based on stock information;

determining a delivery date for delivering the ordered commodity;

sending, to the customer, order-reception confirmation information including delivery-date information representing the determined delivery date and the customer order information in a facsimile form or e-mail form; and arranging the delivery of the ordered commodity based on the delivery-date information and customer order information.

In order to achieve the above object, according to the second aspect of the present invention, there is provided an order-reception system comprising:

an order-reception subsystem which receives customer order information sent from a customer, wherein the customer order information includes customer information regarding the customer and at least one of ordering information representing contents of an order for a commodity ordered by the customer and support request information representing contents of a support request;

a business management subsystem which has a customer information database storing the customer information regarding a price of a commodity purchased by the customer with high frequency and a cost of a support requested by the customer with high frequency, and set by a seller; and an order-entry subsystem which executes an order-reception processing based on the customer order information received by said order-reception subsystem, wherein said order-reception subsystem determines to deliver the commodity specified in the ordering information and to provide the support specified in the support information, based on a result of the order reception processing, confirms whether the ordered commodity is delivered and whether the support is provided; and charging the price of the commodity and the cost of the support specified in the ordering information.

In addition to the ordering through a telephone call or facsimile transmission, the order-reception system may further include a network-order-reception subsystem which receives the customer order information sent from the customer through the Internet.

In order to achieve the above object, according to the third aspect of the present invention, there is provided an order-reception system for receiving and handling an order from a customer using at least one computer, said system comprising:

means for receiving customer order information sent from the customer, said customer order information including customer information regarding the customer and at least one of ordering information representing contents of an order for a commodity ordered by the customer and support request information representing contents of a support request;

means for performing the order reception processing based on the received customer order information means for determining to deliver the commodity specified in the ordering information and to provide a support specified in the support request information, based on a result of the order reception processing;

means for confirming whether the commodity is delivered and the support is provided;

a customer-information database which stores the customer information including information regarding a price of a commodity purchased by the customer with high frequency and a cost of a support requested by the customer with high frequency, wherein the price and the cost are set by a seller of the commodity and support; and means for charging a price of the commodity specified in the ordering information and a cost of the support specified in the support request information based on the customer information.

In order to achieve the above object, according to the fourth aspect of the present invention, there is provided a program for controlling a computer to execute the following steps of:

receiving customer order information sent from a customer, the customer order information including customer information regarding the customer and at least one of ordering information representing contents of an order for a commodity ordered by the customer and support request information representing contents of a request for a support;

executing an order-reception processing based on the received customer order information;

determining to deliver the commodity specified in the ordering information and to provide the support specified in the support request information, based on a result of the order-reception processing;

confirming whether the commodity has been delivered and whether the support has been provided; and charging a price of the commodity specified in the ordering information and a cost of the support specified in the support request information, based on the customer information including information regarding a price of each commodity purchased by the customer with high frequency and a cost of each support requested by the customer with high frequency, wherein the price and the cost are set by a seller of the commodity and support.

BRIEF DESCRIPTION OF THE DRAWINGS

The object and other objects and advantages of the present invention will become more apparent upon reading of the following detailed description and the accompanying drawings in which:

FIG. 16A is a diagram schematically showing the structure of a system for receiving orders for commodities, according to the eighth embodiment of the present invention, and FIG. 16B is a diagram showing tasks of a seller and supplier (ODES);

FIG. 17 is a diagram for explaining a membership registration processing to be carried out in an ODES (Office Supplies Delivery Service);

FIG. 21 is a diagram showing an example of a user application form for use in registering a user into the ODES;

FIG. 22 is a diagram showing an example of a user application form for use in registering a user into the ODES;

FIG. 26 is a diagram showing an example of customer information in the ODES.

DETAILED DESCRIPTION OF THE PREFERRED EMBODIMENTS

Preferred embodiments of the present invention will now be described with reference to the accompanying drawings.

Particularly, systems according to the embodiments of the present invention will schematically be explained with reference to any one of FIGS. 1 to 4.

Figure 1:
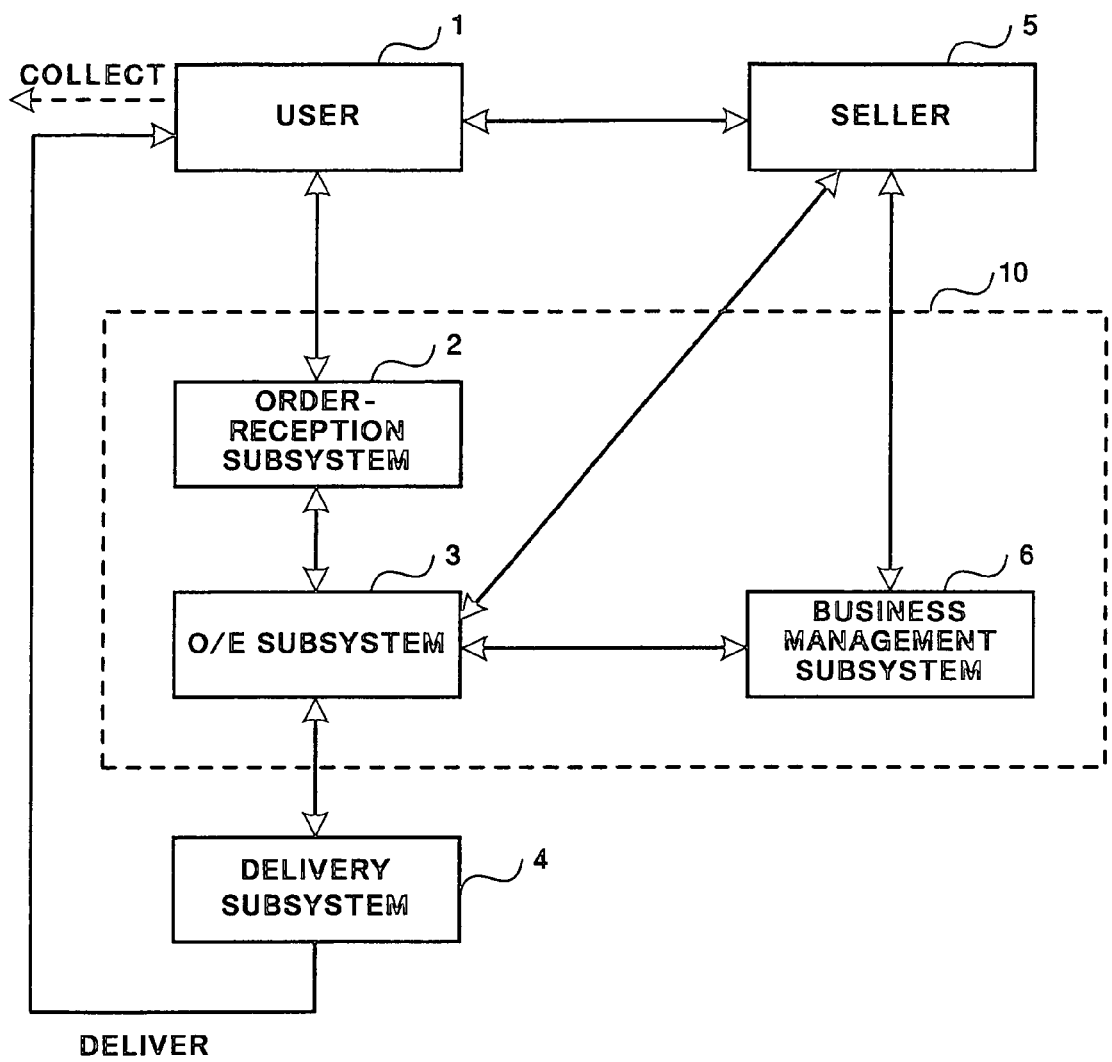
FIG. 1 is a functional block diagram schematically showing a system for receiving orders for commodities and delivering the ordered commodities, according to the first embodiment of the present invention.
Figure 2:
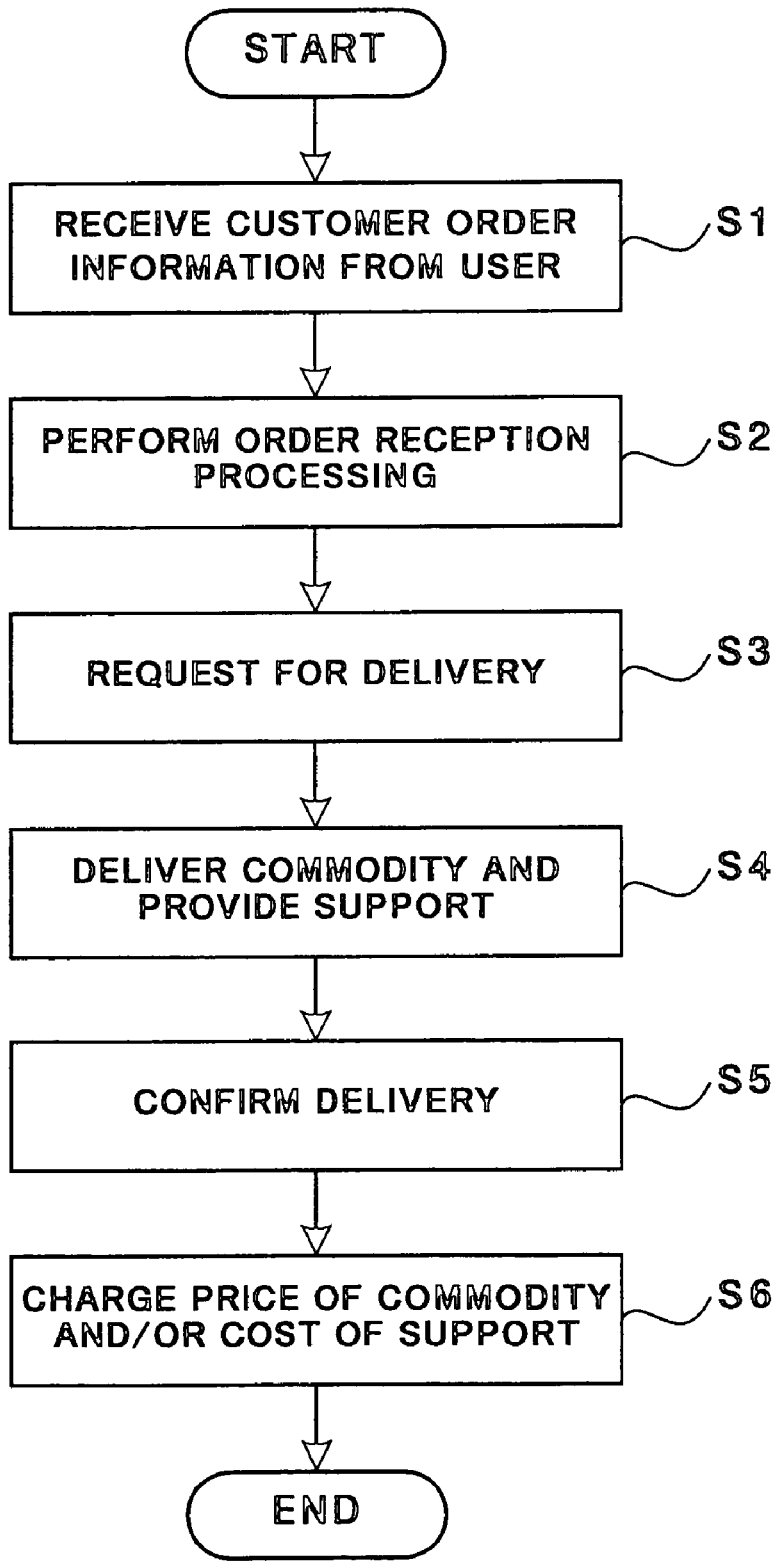
FIG. 2 is a flowchart for schematically explaining a method of receiving orders for commodities and delivering the ordered commodities, employed in the system according to the first embodiment of the present invention.

FIG. 1 is a structural diagram schematically showing a system for receiving orders for commodities and delivering the ordered commodities, according to the first embodiment of the present invention. FIG. 2 is a flowchart for explaining a method of receiving orders for commodities and delivering the ordered commodities, employed in the system of FIG. 1.

The system according to the first embodiment of the present invention basically comprises an order receiving and handling subsystem 10 and a delivery subsystem 4. The order receiving and handling subsystem 10 receives an order for a commodity (commodities) or various supports from a user 1. After this, the order receiving and handling subsystem 10 registers information regarding the received order, instructs the delivery subsystem 4 to deliver the ordered commodity and give the user 1 a bill for the commodity. The user 1 orders for the commodity using any one of communications means of facsimile, telephone, e-mail, etc.

As shown in FIG. 1, the order receiving and handling subsystem 10 includes an order-reception subsystem 2, an order entry subsystem (hereinafter referred to as an O/E subsystem) 3 and a business management subsystem 6. The order-reception subsystem 2 receives order contents of the user 1 as customer order information, automatically or in accordance with input operations of an operator. The customer order information includes: user information, representing the name, address, phone number, fax number of the user; order information representing the ordering contents of a target commodity (commodities); and/or support-request information representing the contents of a ordered support. The O/E subsystem 3 collects the customer order information received by the order-reception subsystem 2, and carries out an order reception processing in relation to the customer order information. The business management subsystem 6 registers the payment as a price for a commodity and/or ordered support, which is determined between the user 1 and a seller 5, together with personal information of the user.

The delivery subsystem 4 refers to the information registered by the business management subsystem 6 and arranges the delivery of the ordered commodity or the providing of various supports, based on a result of the order reception processing done by the O/E subsystem 3.

Explanations will now be made to a typical method of receiving orders for commodities and delivering the ordered commodities, with reference to FIG. 2.

The order-reception subsystem 2 receives customer order information from the user 1 (Step S1). In response to an instruction from the order-reception subsystem 2, the O/E subsystem 3 carries out an order reception processing and registers the received customer order information (Step S2). The order-reception subsystem 2 instructs the delivery subsystem 4 to arrange the delivery of a commodity and/or support specified in the customer order information (request for delivery; Step S3). The delivery subsystem 4 arranges the delivery of the commodity and/or the providing of a support which is shown in the customer order information (Step S4). The order-reception subsystem 2 confirms the delivery of the commodity and the providing of the support (Step S5). After this, the order-reception subsystem 2 charges the price of the commodity and/or support(s) which is(are) specified in the customer order information to the user 1 and/or the seller 5, based on the payment of the commodity and/or support which is registered in the business management subsystem 6 (Step S6). In FIG. 1, the seller 5 communicates directly with the O/E subsystem 3. It is also obvious that the order-reception subsystem 2 can communicate with the seller 5, simply depending on how the procedures are shared between the order-reception subsystem 2 and the O/E subsystem 3.

In the step S4, the delivery subsystem 4 arranges the delivery of the commodity based on the customer order information. If support-request information is included in the customer order information, the delivery subsystem 4 instructs the deliverer to perform a specified support, when delivering the commodity to the user. In the step S6, before the commodity is successfully delivered, a bill for the commodity is created, and the created bill given to the seller 5 or user 1 after the delivery of the commodity. In the case where the bill is to be given to the user 1, the bill shows the price for the commodity and support and includes the charge for the seller 5, and the charge for the seller 5 is paid thereto afterwards. In the case where the bill is to be given to the seller 5, the bill shows the price calculated by subtracting the charge for the seller 5 from the price for the commodity and support. The bill to be given to the user relates to the sales of the commodity dealt based on the contract made between the user and the seller 5. Thus, likewise the above, the order-reception subsystem 2 incorporated into the above system may automatically create the bill for the commodity or support and then give the created bill to either the seller 5 or the user 1. Otherwise, the system may automatically create the bill addressed to the user 1, and sends the created bill to the seller. After this, the seller 5 having received the bill may make a change in the received bill and send the bill to the user 1, or sends the bill thereto as is.

Figure 3:
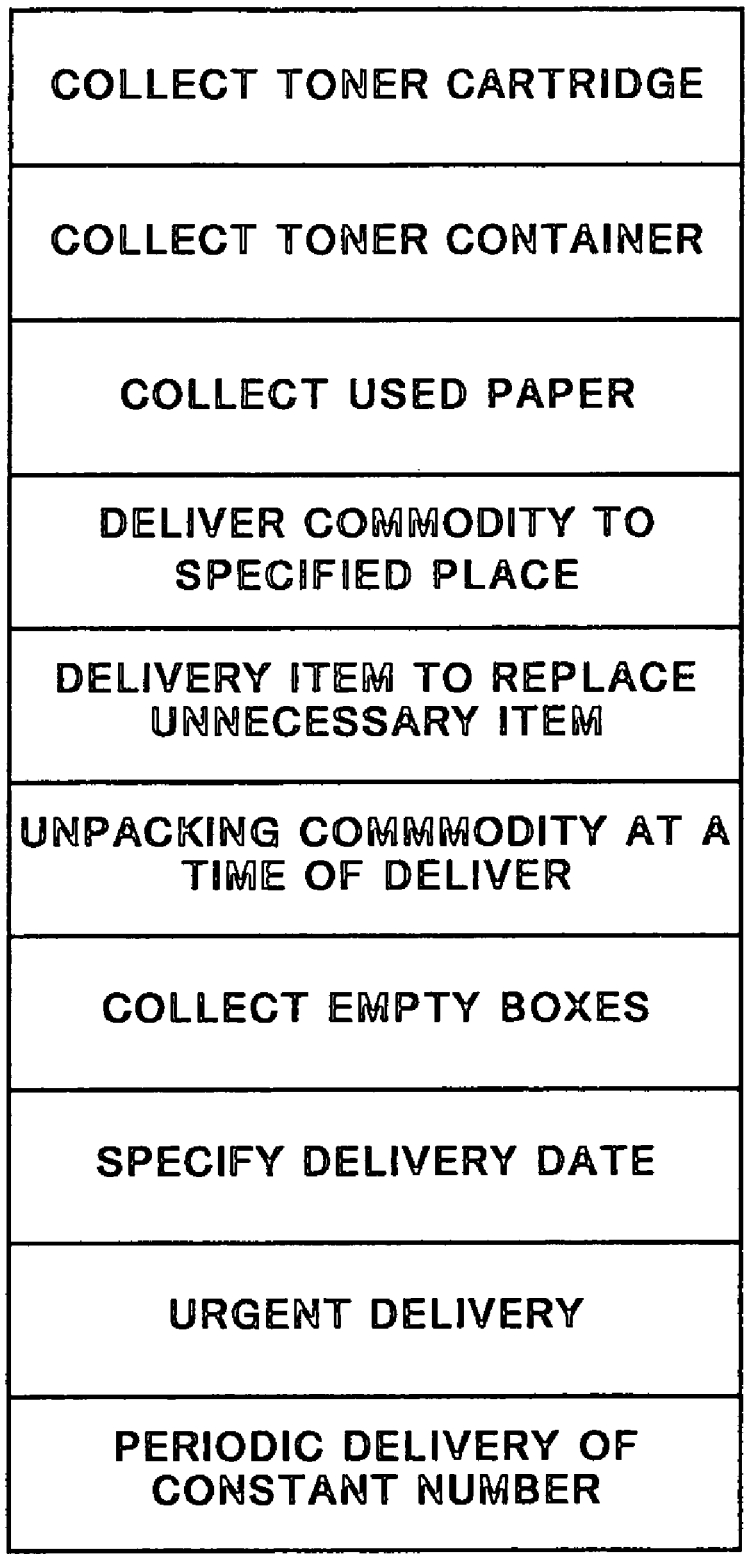
FIG. 3 is a diagram showing an example of support-request information.

FIG. 3 is a diagram showing an example of support-request information. It is preferred that the support-request information include information regarding a request for collecting recyclable commodities (product items), such as used toner cartridges, used toner containers, used paper, etc.

Figure 4:
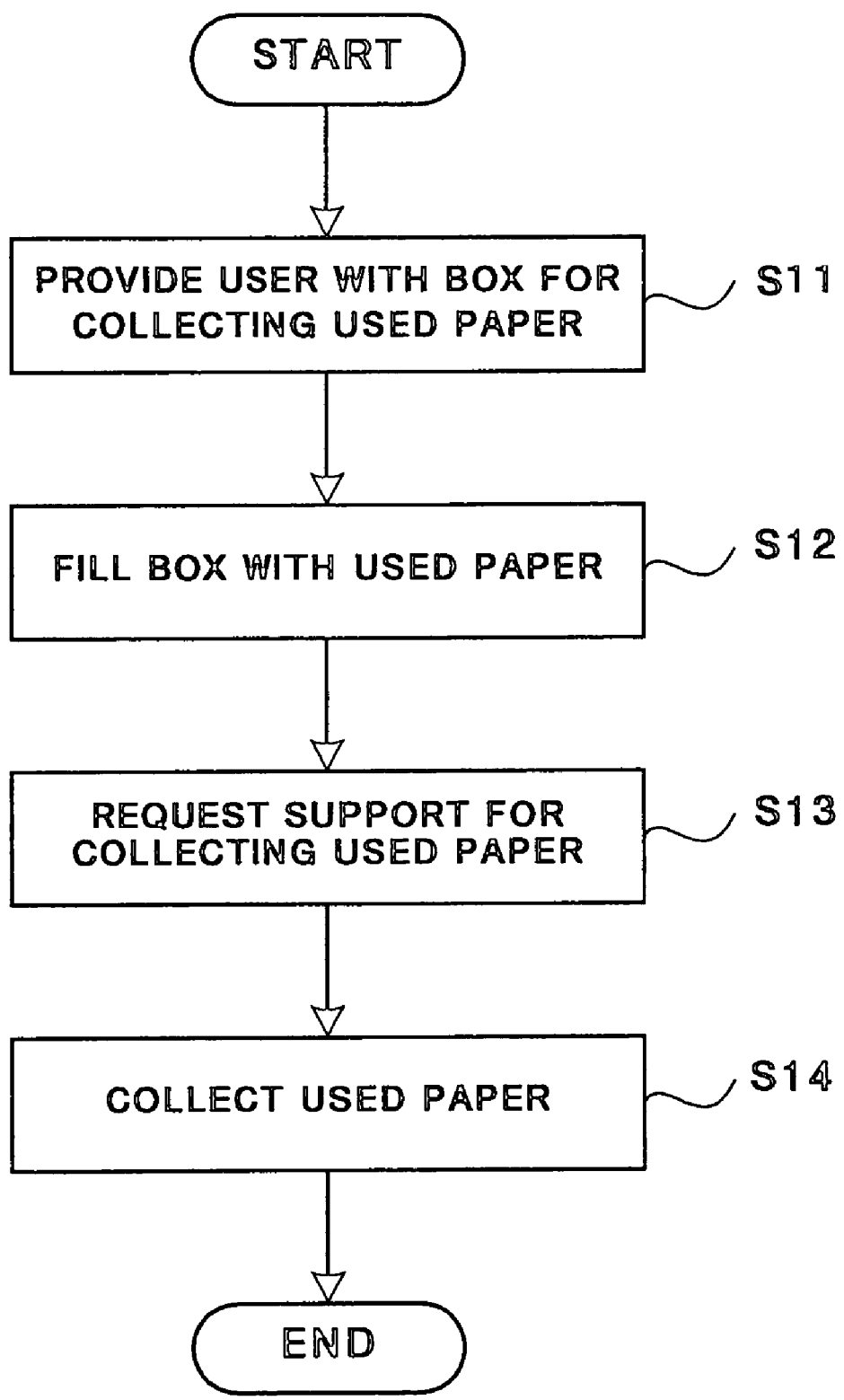
FIG. 4 is a flowchart for explaining a method of collecting used paper.

FIG. 4 is a flowchart for explaining a method of collecting used paper. A box for collecting used paper is given to the user (Step S11). If the box is filled with used paper (Step S12), the system 100 receives a support request regarding the collection of used paper, from the user (Step S13). Then, the system 100 collects used paper based on the support-request information representing the request contents of the support (Step S14).

The above-described support-request information includes information representing the contents of the various supports, such as delivering of the commodity to a user-specified place, unpacking the commodity when delivering the commodity, collection of an empty box that the user does not need, replacing of commodities using a FIFO (First In First Out) method, specification of the delivery date for the commodity, requesting of urgent delivery, periodic delivery of a constant number of specified commodities ordered so as to keep a constant amount of stock. The delivery subsystem 4 instructs the seller to perform user support in accordance with the above support-request information.

The system of FIG. 1 will now specifically be described with reference to FIG. 5.

Figure 5:
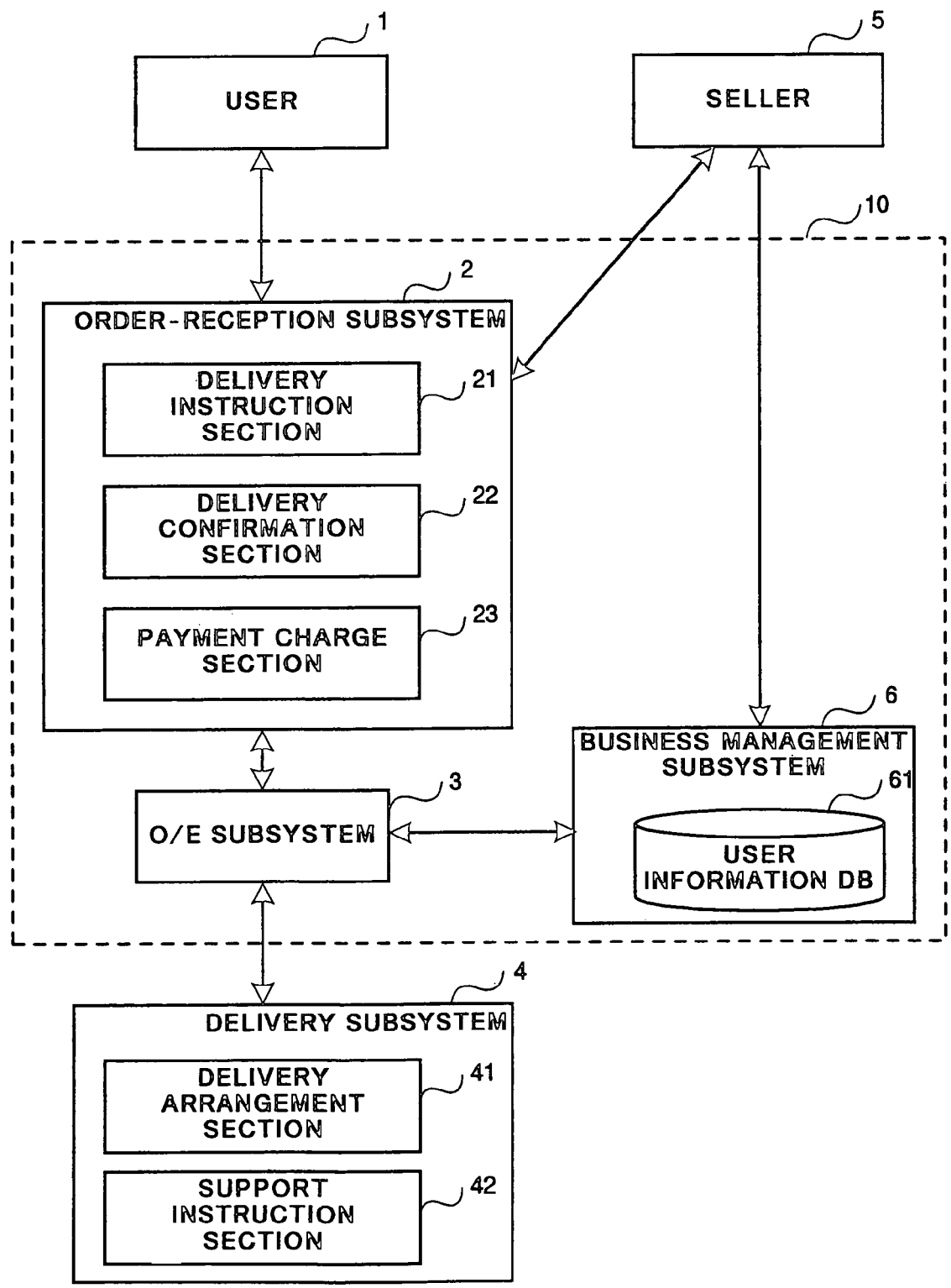
FIG. 5 is a diagram specifically showing the structure of the system of FIG. 1.

FIG. 5 is a functional block diagram specifically showing the system schematically shown in FIG. 1. As illustrated in FIG. 5, the order-reception subsystem 2 has a delivery instruction section 21, a delivery confirmation section 22 and a payment charge section 23. The delivery instruction section 21 sends the received customer order information to the delivery subsystem 4 through the O/E subsystem 3, so as to instruct the delivery subsystem 4 to delivery the commodity and provide the support as specified in the customer order information. The delivery confirmation section 22 confirms that the delivery of the commodity and support specified in the customer order information are successfully performed. After the delivery confirmation section 22 confirms the delivery of the commodity and support, the payment charge section 23 charges, to the user 1 and/or seller 5, the price of the commodity and/or support specified in the customer order information, based on the payment as an equivalent for the commodity/support and user personal information which are stored in the user information database 61. The delivery subsystem 4 has a delivery arrangement section 41 and a support instruction section 42. The delivery arrangement section 41 arranges the delivery of the ordered commodity, in response to an instruction from the delivery instruction section 21. In the case where the support-request information is included in the customer order information, the support instruction section 42 instructs a corresponding distributor to perform a user support specified in the support-request information at the time of delivering the ordered commodity.

Explanations will now be made to a system for receiving orders for commodities and delivering the ordered commodities, according to the second embodiment of the present invention, with reference to FIGS. 6 and 7.

Figure 6:
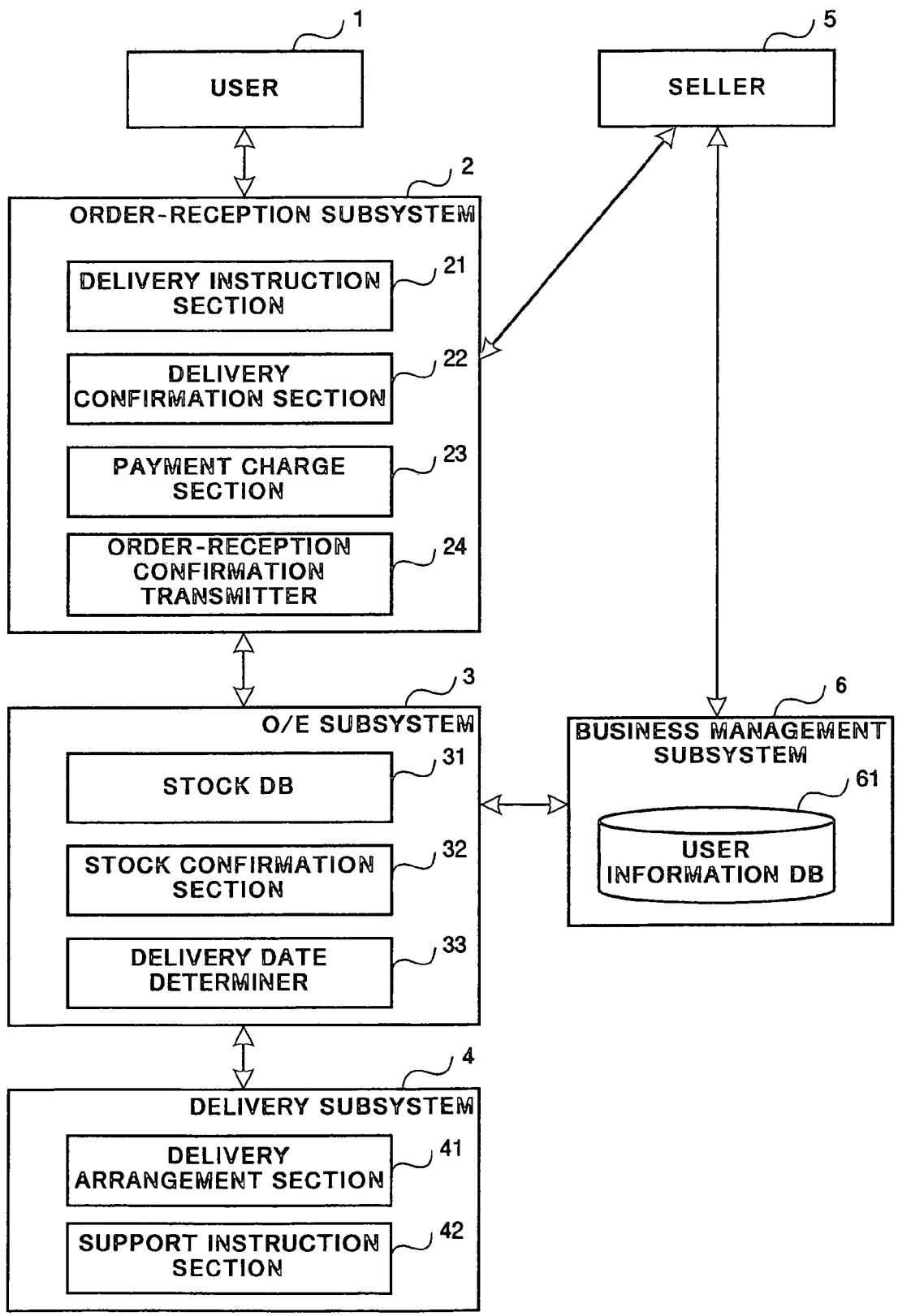
FIG. 6 is a functional block diagram showing a system for receiving orders for commodities and delivering the ordered commodities, according to the second embodiment of the present invention.

FIG. 6 is a functional block diagram showing the system of the second embodiment of the present invention. In the system of the second embodiment, the order-reception subsystem 2 further includes an order-reception confirmation transmitter 24, and the O/E subsystem 3 further includes a stock database (a stock DB) 31, a stock confirmation section 32 and a delivery date determiner 33, in addition to each of the sections included in each subsystem of the system shown in FIG. 5. The stock database 31 stores stock information of commodities. The stock confirmation section 32 confirms whether there is a stock of the ordered commodities, based on the stock information stored in the stock database 31. The delivery date determiner 33 determines the delivery date of the ordered commodity as specified in the customer order information, based on a confirmation result of the stock by the stock confirmation section 32 and the customer order information. The order-reception confirmation transmitter 24 automatically sends the delivery date determined by the delivery date determiner 33, together with the customer order information, to the user in the facsimile or e-mail form as order-reception information. Further, the delivery instruction section 21 instructs the distributor to deliver the commodity on the delivery date determined by the delivery date determiner 33. The stock database 31, the stock confirmation section 32, the delivery date determiner 33 and the order-reception confirmation transmitter 24 are not necessarily included in the subsystems in the manner illustrated in FIG. 6, and can be included in any part of the system of FIG. 6.

Figure 7:
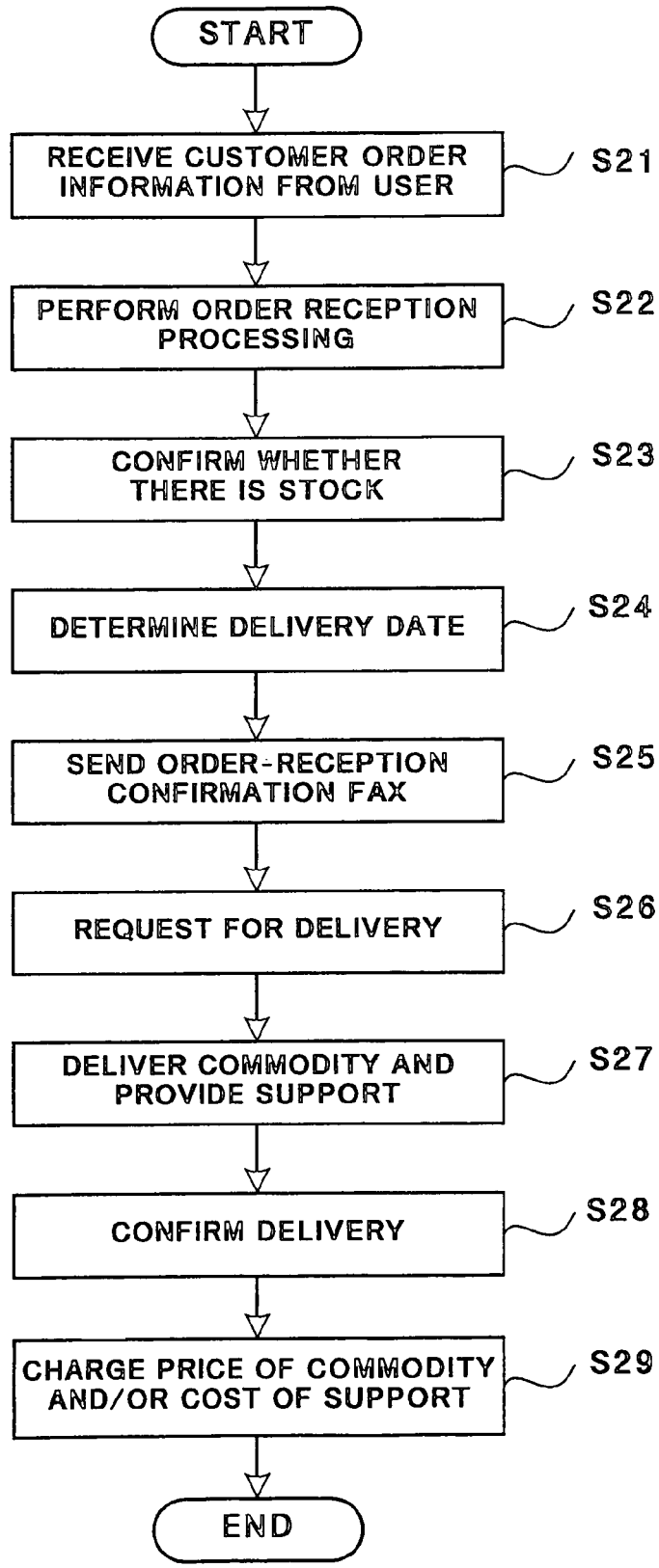
FIG. 7 is a flowchart for schematically explaining a method of receiving orders for commodities and delivering the ordered commodities, employed in the system of FIG. 6.

FIG. 7 is a flowchart for explaining a method of receiving orders for commodities and delivering the ordered commodities, employed in the system of FIG. 6.

The order-reception subsystem 2 receives customer-order information from users (Step S21). In response to an instruction from the order-reception subsystem 2, the O/E subsystem 3 carries out an order-reception processing based on the received customer-order information, and registers the received customer order information (Step S22). Further, the stock confirmation section 32 of the O/E subsystem 3 confirms whether there is a stock of a ordered commodity, based on stock information stored in the stock database 31 (Step S23). Depending on whether there is a stock of the commodity as confirmed in the step S23, the delivery determiner 33 determines the delivery date (for the product item) included in the customer order information (Step S24). The order-reception confirmation transmitter 24 of the order-reception subsystem 2 automatically sends information representing the delivery date as order-reception information to the user in the facsimile or e-mail form, together with the customer order information (Step S25). After the confirmation of the delivery date, the delivery instruction section 21 of the order-reception subsystem 2 instructs the delivery subsystem 4 to arrange the delivery of the ordered commodity, based on the customer order information and delivery date, through the O/E subsystem 3 (Step S26). After this, the delivery confirmation section 22 confirms the delivery of the commodity and providing of the support (Step S27), as specified in the customer order information (Step S28). Then, the payment charge section 23 charges the price of the commodity or support, as shown in the customer order information of the business management subsystem 6 to the user 1 and/or seller 5, based on the payment as an equivalent for the commodity or support and user personal information which are registered in the business management subsystem 6 (Step S29).

In the system of the above embodiment, the order-reception subsystem 2 handles any questions regarding the commodity or support from the user 1 and seller 5. After this, the order-reception subsystem 2 stores frequently asked questions from the user 1 and seller 5, in association with their corresponding answers, and provides the user and/or seller 5 with the stored inquiry information addressed to both or either one of the user 1 and the seller 5. In this case, the order-reception subsystem 2 may post or serve the stored inquiry information on a Web page through the Internet or on a catalog, etc. Having served the inquiry information on the Web page, etc., the seller can use the information for a business case, thereby providing a user-friendly system. Further, it is preferred that the system calculate the statistics based on the user personal information, payment as an equivalent for the ordered commodity, customer order information or the like managed by the business management subsystem 6, and update the inquiry information with the calculated statistics.

Figure 8:
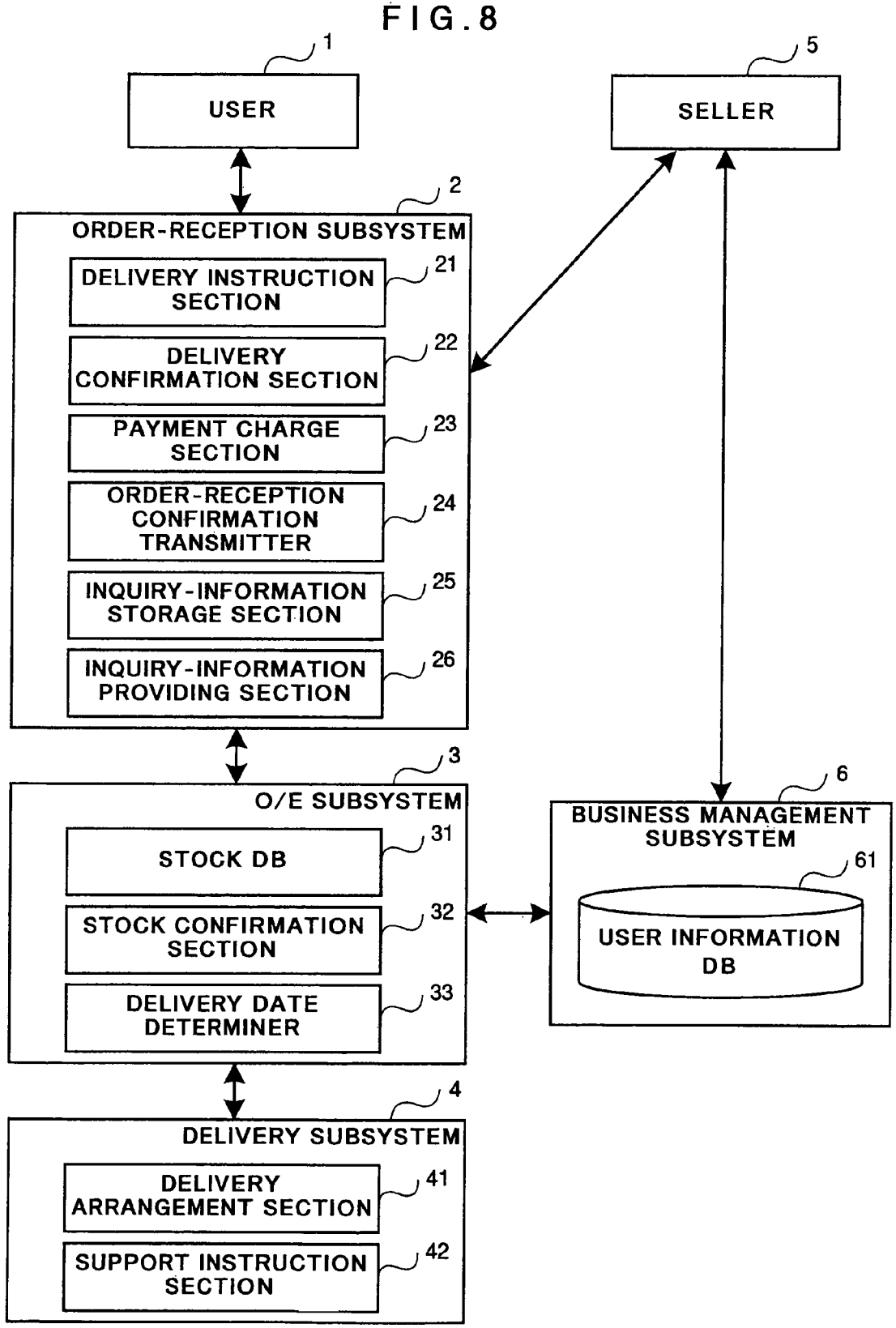
FIG. 8 is a functional block diagram showing a system for receiving orders for commodities and delivering the ordered commodities, according to the third embodiment of the present invention.

FIG. 8 is a functional block diagram showing a system for receiving orders for commodities and delivering the ordered commodity, according to the third embodiment of the present invention.

In the system of this embodiment, the order-reception subsystem 2 further includes an inquiry-information storage section 25 and an inquiry-information providing section 26. The inquiry-information storage section 25 handles any questions regarding the commodities or supports from the user 1 and seller 5, and stores the questions in association with their answers. The inquiry-information providing section 26 provides the user 1 and/or seller 5 with the inquiry information stored in the inquiry-information storage section 25. Note that the inquiry-information storage section 25 and inquiry-information providing section 26 are not necessarily included in the order-reception subsystem 2, and can simply be included in the system of this embodiment. The inquiry information may be provided by the inquiry-information providing section 26, posted on a Web page through the Internet, or shown on a catalog, etc.

Figure 9:
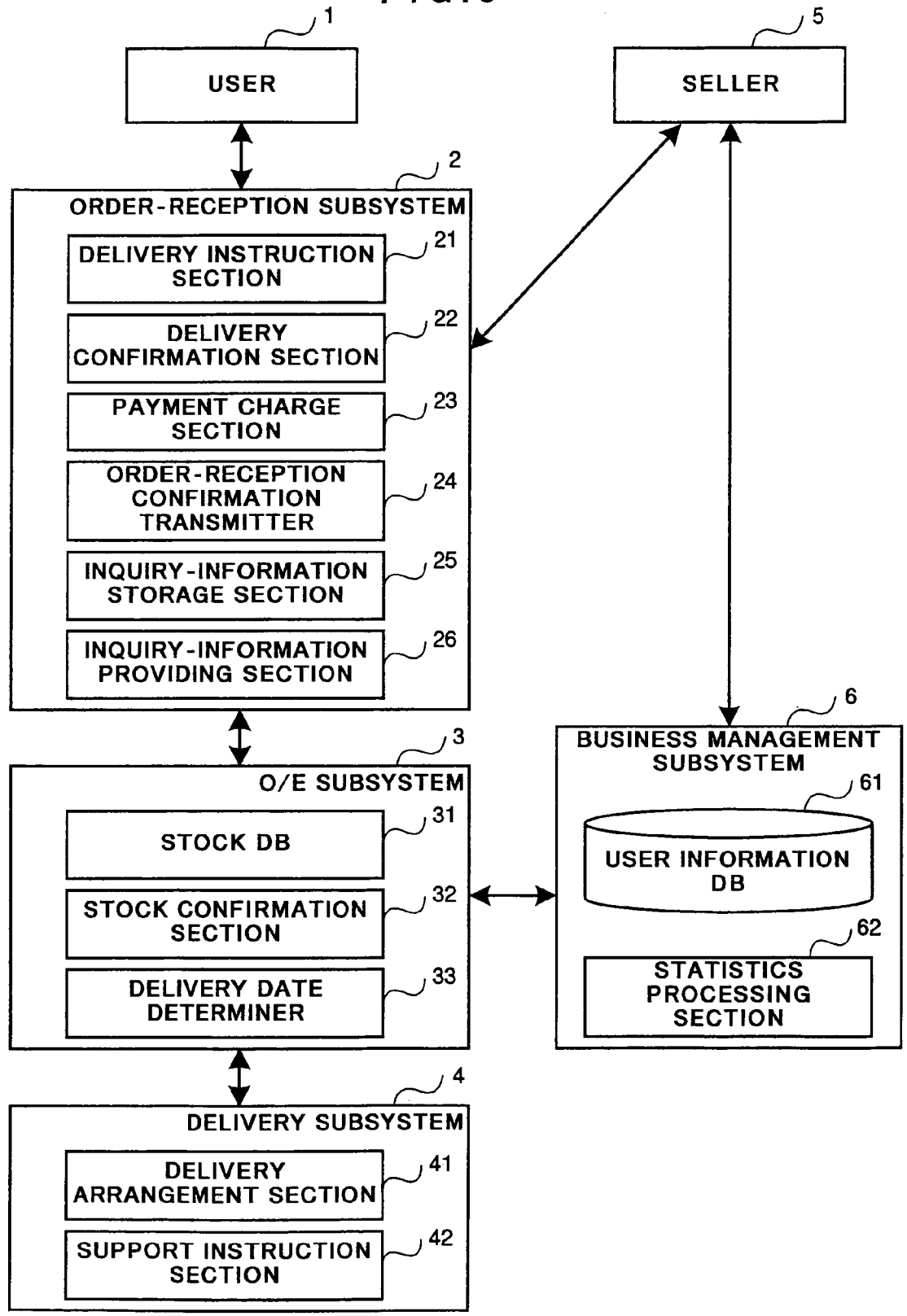
FIG. 9 is a functional block diagram showing a system for receiving orders for commodities and delivering the ordered commodities, according to the fourth embodiment of the present invention.

The system of FIG. 8 may obtain statistics based on the user personal information, payment as an equivalent for the commodity and customer order information, etc. stored in the user-information database 61. Then, the system may update the inquiry information to be provided by the inquiry-information providing section 26 so as to include the resultant statistics. FIG. 9 is a functional block diagram showing a system for receiving orders for commodities and delivering the ordered commodities, according to the fourth embodiment of the present invention.

In the system of FIG. 9, the business management subsystem 6 has a statistics processing section 62 which processes statistics data based on the user personal information, payment as an equivalent for the ordered commodity (support) and customer order information which are stored in the user-information database 61. The inquiry-information providing section 26 updates the inquiry information so as to include the result of the statistics done by the statistics processing section 62. It is not necessary that the statistics processing section 62 be included in the business management subsystem 6, and can be included in any part of the system of this embodiment.

Figure 10:
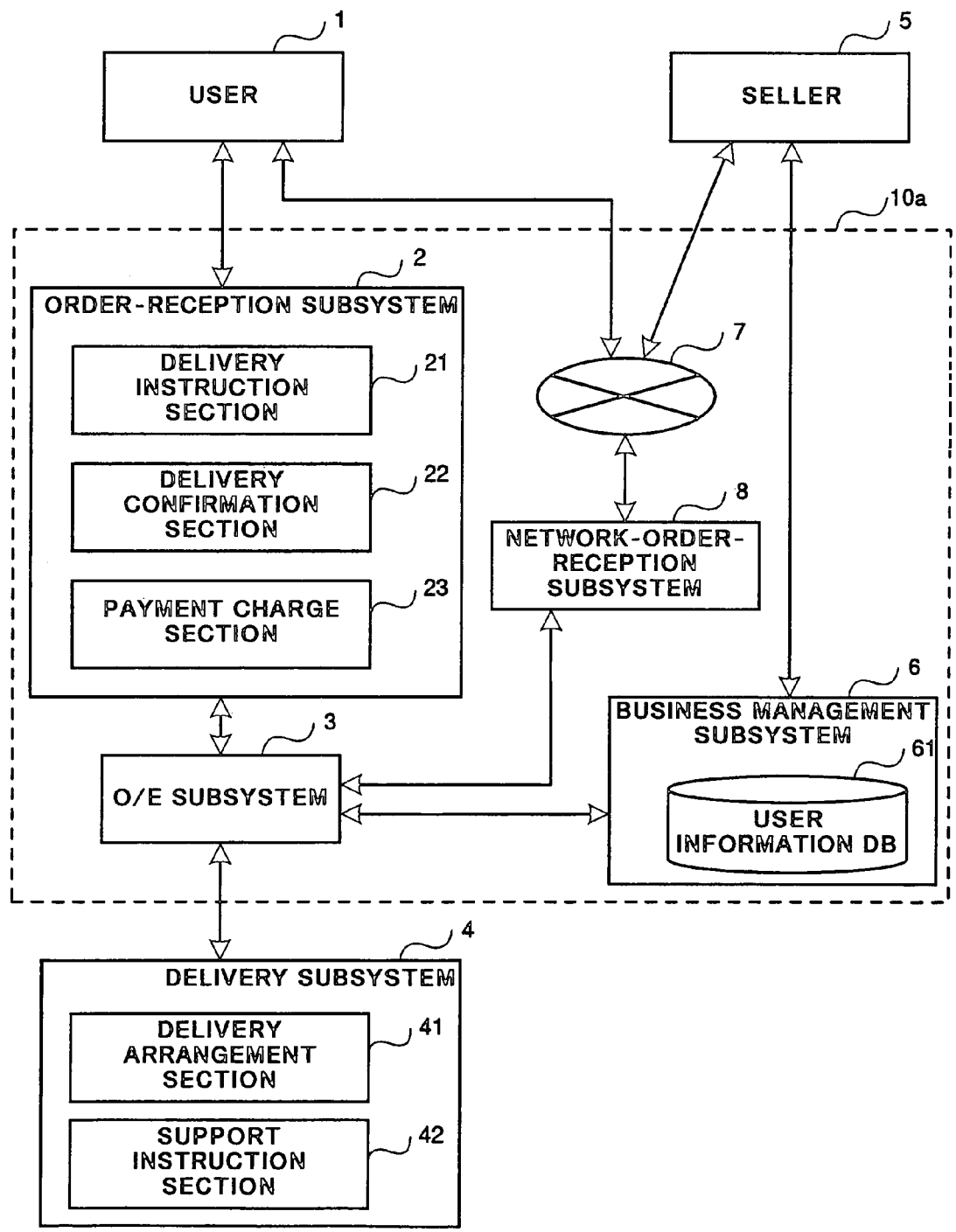
FIG. 10 is a functional block diagram showing a system for receiving orders for commodities and delivering the ordered commodities, according to the fifth embodiment of the present invention.

FIG. 10 is a functional block diagram showing a system for receiving orders for commodities and delivering the ordered commodities, according to the fifth embodiment of the present invention.

The system of this embodiment has the structure to receive orders from customers through the Internet 7, in addition to the structure of the system shown in FIG. 5. In FIG. 10, the same reference numeral is assigned to each of any of those subsystems having the function as any of those of the subsystems included in the system of FIG. 5. The system of this embodiment basically includes an order receiving and handling subsystem 10a and the delivery subsystem 4. The order receiving and handling subsystem 10a further includes a network-order-reception subsystem 8 for receiving customer order information sent through the Internet, in addition to those subsystems included in the order receiving and handling subsystem 10 of FIG. 5. The network-order-reception subsystem 8 receives the same customer order information as that described above. In the system of this embodiment, the O/E subsystem 3 combines the customer order information received by the order-reception subsystem 2 with the customer order information received by the network-order-reception subsystem 8. Based on the customer order information, the system of this embodiment delivers the ordered commodity, provides the user with the support ordered, and charges the bill to the user or seller.

Figure 11:
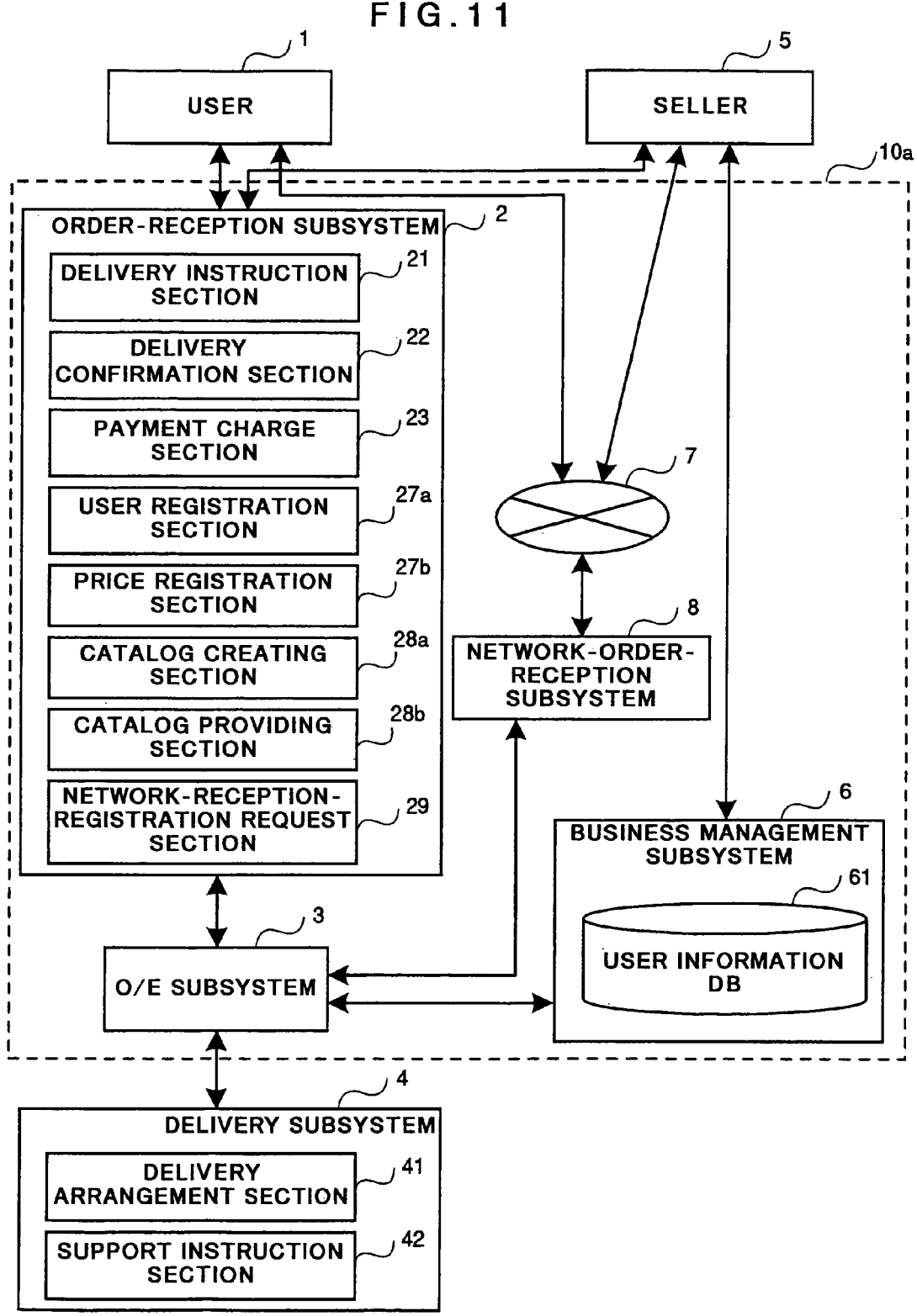
FIG. 11 is a functional block diagram showing a system for receiving orders for commodities and delivering the ordered commodities, according to the sixth embodiment of the present invention.

In each of the above-described embodiments, the information regarding the user may be registered in the user information database, and each of various services may be provided to the user based on the registered user information. FIG. 11 is a functional block diagram showing a system for receiving orders for commodities and delivering the ordered commodities, according to the sixth embodiment of the present invention.

In the system of this embodiment, the order-reception subsystem 2 further includes a user registration section 27a, a price registration section 27b, a catalog creating section 28a, a catalog providing section 28b and a network-reception-registration request section 29.

Right after the seller 5 inputs information regarding its customer as a user of the system of this embodiment, the user registration section 27a registers the input user information in the user information database 61.

Right after the seller 5 and user 1 inputs information regarding the set payment as a price/charge of each commodity/support which is frequently purchased/requested by the user 1 at the time of user registration or at any time, the user price registration section 27b registers the price information in the user information database 61.

The catalog creating section 28a creates an order form for purchasing commodities and a catalog, based on the price information of the commodity and support and user personal information which are stored in the user-information database 61.

The catalog providing section 28b provides the user with the order form and catalog, which are created by the catalog creating section 28a.

The network-reception-registration request section 29 registers, in the user-information database 61, information representing that the user to be registered is permitted to use the network-order-reception subsystem 8, based on the registered user information. The network-reception-registration request section 29 may request the network-order-reception subsystem 8 to register information representing whether or not the user is permitted to use the network-order-reception subsystem 8. In the case where the system of this embodiment does not include the network-order-reception subsystem 8, it does not need to include the network-order-reception registration request section 29.

Figure 12:
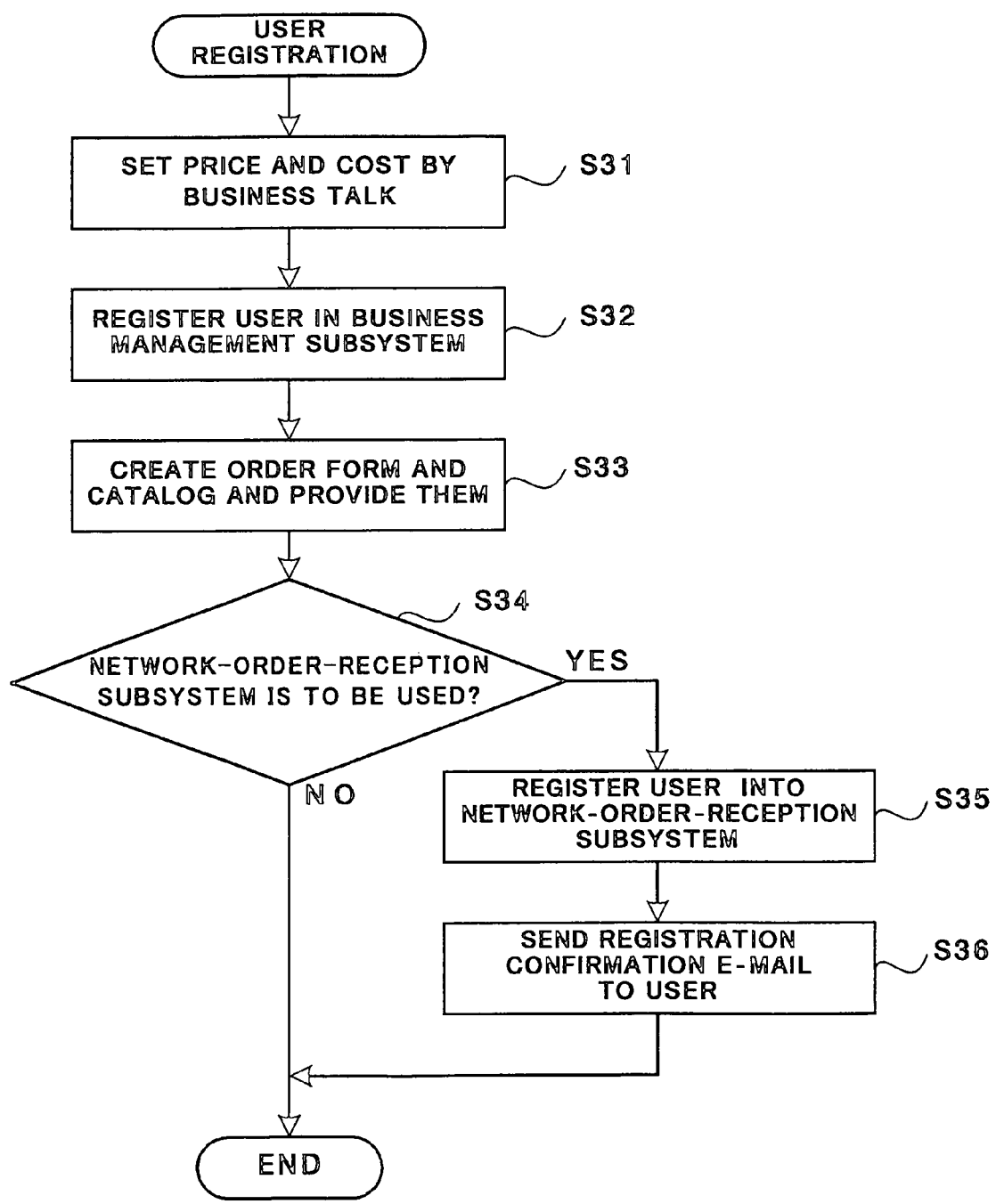
FIG. 12 is a flowchart for explaining a user registration method executed by the system of FIG. 11.

FIG. 12 is a flowchart for explaining a user registration method employed in the system of FIG. 11. The seller 5 registers its customers as users of the system of this embodiment, in the user-information database 61, sets the price (charge) for each of the frequently purchased commodities and/or supports, and registers information regarding the set price (charge) in the user-information database 61. That is, the seller 5 has talks with the user 1 for a commodity to be dealt therebetween, and sets the price (charge) for the commodity or support (Step S31). To register user information and information regarding the set payment, the seller 5 inputs the information into the order-reception subsystem 2. Each of the user registration section 27a and the price registration section 27b included in the order-reception subsystem 2 registers the input information into the user-information database 61 (Step S32). In the system of this embodiment, the business management subsystem 6 may include the user registration section 27a and the price registration section 27b. In this structure, the seller 5 may register the above-described user information and price information directly into the business management subsystem 6. The catalog creating section 28a of the order-reception subsystem 2 creates an order form for purchasing commodities and a catalog show the commodities, based on the price (charge) of commodities and/or supports and user information which are stored in the user-information database 61. Then, the catalog providing section 28b provides the user with the created catalog (Step S33).

Further, in the case where the network-order-reception subsystem 8 is incorporated into the system of this embodiment, it is determined whether a network-order-reception subsystem for receiving a request for purchasing a commodity through the Internet is used based on the user registration information (Step S34). In the case where it is determined that the network-order-reception subsystem is to be used, the network-order-reception registration request section 29 registers information representing that the network-order-reception subsystem is to be used thereto (Step S35), and sends a registration confirmation e-mail to the user 1 (Step S36). Note that the information representing that the network-order-reception subsystem is to be used may be registered by requesting the network-order-reception subsystem 8 to do so or by setting the business management subsystem 6 to directly register the information.

Figure 13:
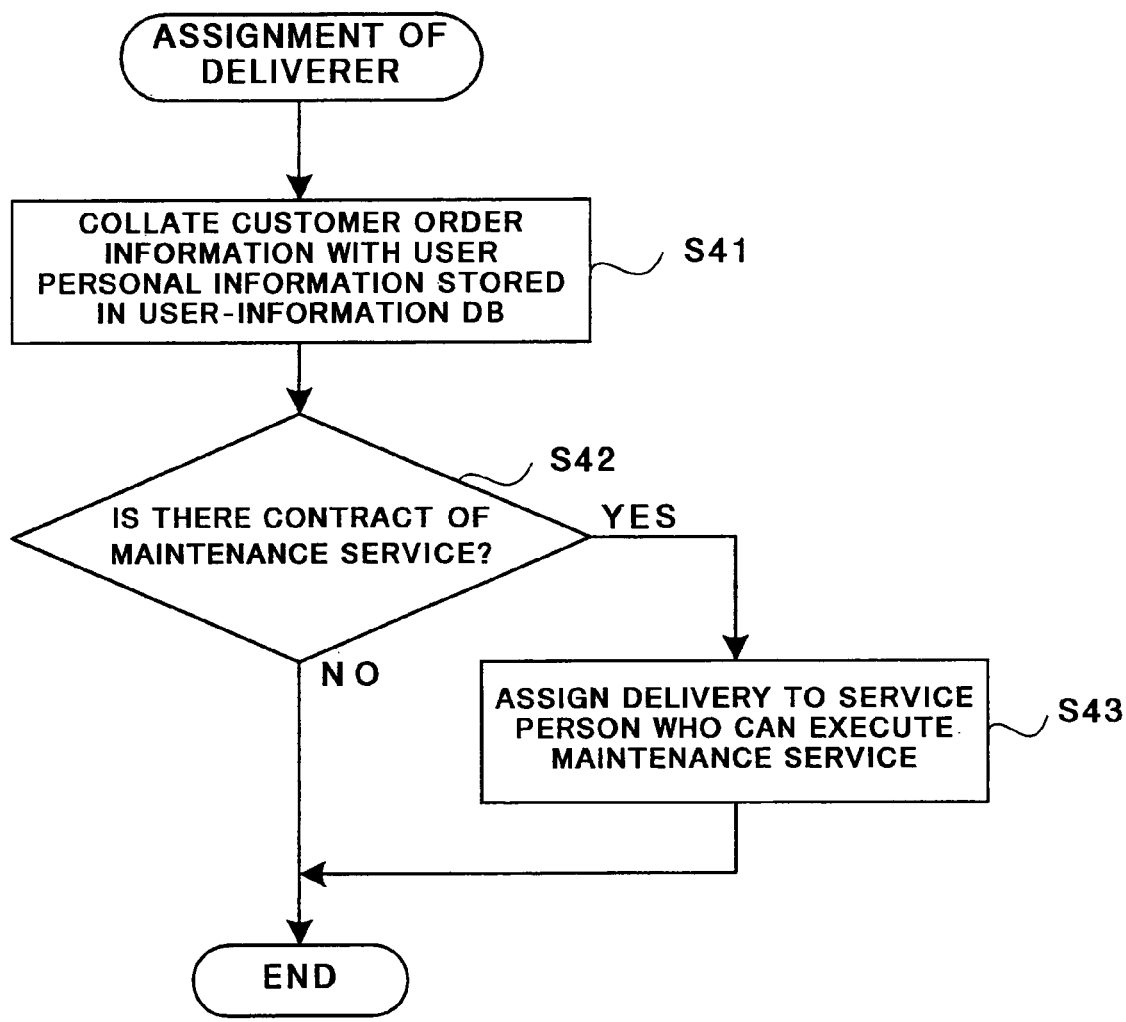
FIG. 13 is a flowchart for explaining a maintenance service method employed in the system of FIG. 11.

In each of the systems according to the embodiments, maintenance services may be done based on the contract. FIG. 13 is a flowchart for explaining a maintenance service method employed in such a system.

The order-reception subsystem 2 collates the customer order information with the user personal information stored in the user-information database, through the O/E subsystem 3 (Step S41). Then, the order-reception subsystem 2 determines whether there is made a maintenance contract for an OA apparatus with the user (Step S42). In the case where the user has made a maintenance contract for the OA apparatus with the seller, etc., the order-reception subsystem 2 assigns a service person who can execute the maintenance support specified in the maintenance contract to deliver the commodity to the user (Step S43). Then, the order-reception subsystem 2 instructs the delivery subsystem 4 to execute the maintenance support specified in the contract for the OA apparatus at the time of the delivery. In the case where the service person repairs or periodically inspects the purchased commodity, he/she checks the stock of any commodities. At this time, if there are any commodities to be purchased, the service person may make an order for the commodities toward the above-described network-order-reception system, using a cellular phone, etc.

Accordingly, the explanations have been made to the system for receiving orders for commodities, according to the preferred embodiments of the present invention. However, the present invention can be realized, by taking out the order receiving and handling subsystem from the system so as to serve as an order receiving and handling system.

For example, in the flowchart shown in FIG. 2, the order-reception subsystem 2 may instructs the distributor, instead of the delivery subsystem 4, to arrange the delivery of a commodity and/or support in the step S3. This is the same in the step S26 of the flowchart shown in FIG. 7.

Figure 14:
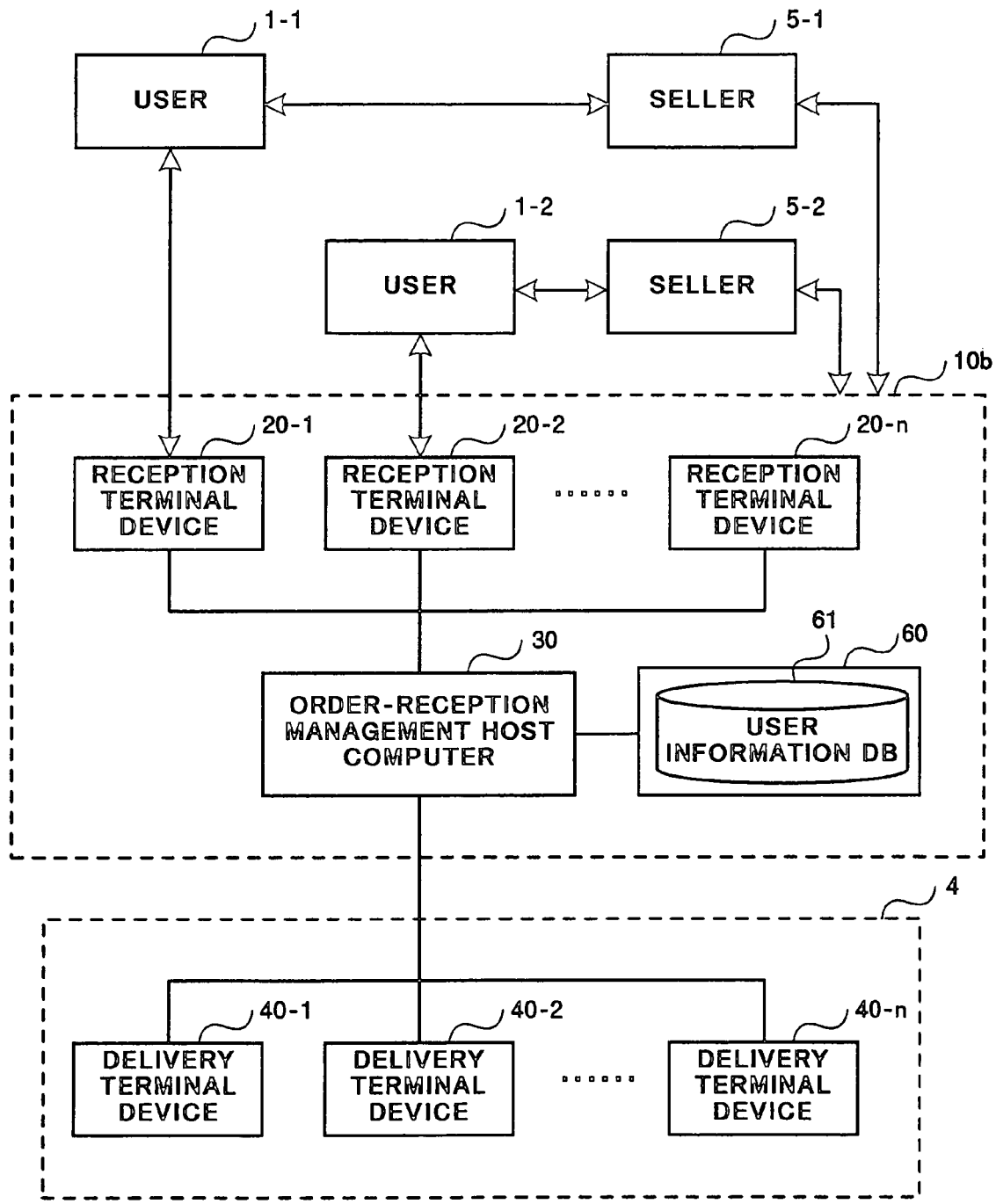
FIG. 14 is a diagram showing the structure of a system for receiving orders for commodities and delivering the ordered commodities, according to the seventh embodiment of the present invention.

Any of the subsystems included in the system according to each of the above embodiments can be a general personal computer or dedicated server computer, etc. FIG. 14 is a diagram showing the structure of the hardware of a system for receiving orders for commodities and delivering the ordered commodities, according to the seventh embodiment of the present invention.

The system of this embodiment basically comprises an order receiving and handling subsystem 10b and the delivery subsystem 4. In the case where a network-order reception subsystem (not illustrated) is included in the system, for receiving orders for commodities and delivering the ordered commodities, the network-order reception subsystem has a network-order reception server apparatus including a general personal computer, server computer, dedicated server computer, etc. A program for executing the server apparatus to function as the above-described network-order reception subsystem is installed in the network-order reception server apparatus. Further, this network-order reception server apparatus transmits transmission information created based on information regarding the ordered commodity or support, through the network.

The order receiving and handling subsystem 10b comprises one or more reception terminal devices 20-1, 20-2, . . . 20-n, an order-reception management host computer 30 and a business management apparatus 60. The one or more reception terminal devices 20-1, 20-2, . . . 20-n receive customer order information respectively from users 1-1, 1-2, . . . , having had a business talk with the respective sellers 5-1, 5-1, . . . . Each of the reception terminal devices 20-1, 20-2, 20-n includes a general personal computer or a computer serving as the reception terminal device. A program for controlling the reception terminal device to function as the above-described order-reception subsystem is installed in each of the reception terminal devices. The order-reception management host computer 30 manages the customer order information received by the reception terminal devices and network-order reception server device. The order-reception management host computer 30 includes a general personal computer or server computer, and a program for controlling the order-reception management host computer 30 to act as the above-described O/E subsystem is installed in therein. The business management apparatus 60 includes a storage device, such as a hard disk or the like and includes the user-information database 61. As the above-described business management subsystem, the business management apparatus 60 supplies the order-reception management host computer 30, etc. with the user information stored in the user-information database 61. The business management apparatus 60 may be a database server having an access control function for controlling the access to the user-information database 61. Further, the business management apparatus 60 may execute a part of the order-reception subsystem or O/E subsystem.

The above-described delivery subsystem 4 has one or more delivery terminal devices 40-1, 40-2, 40-n and delivery means. Each of the one or more delivery terminal devices 40-1, 40-2 and 40-n includes a general personal computer or dedicated terminal device, etc. A program for controlling each of the delivery terminal devices to function as a delivery subsystem is installed thereto. In this structure, each of the delivery terminal devices receives instructions from the delivery instruction section, and arranges the delivery of ordered commodities or the providing of supports. The delivery means delivers any ordered commodities and/or provides supports to users.

Each of the sellers 5 includes bill receiving means for receiving the bill, payment requesting means for requesting the user to pay the charged amount of money based on the received bill, and money collection means for collecting money from the user. Each of the seller 5 includes the order receiving and handling subsystem 10b and a terminal device (seller terminal) connected to each of the sellers 5 through a private line or Internet. This terminal device included in each of the sellers 5 receives the bill for the ordered commodity or support, from the order-handing subsystem 10b, charges the particular amount of money to the user automatically using an e-mail, etc., and finally collects the money from the user through electronic settlement. Otherwise, each of the seller may create the bill in a written form addressed to each user based on the bill received by the terminal device, and may charge the amount of money for the commodity or support to the user based on the created bill.

Each of the users 1 may include a terminal device (a user terminal) connected to the seller terminal or order receiving and handling subsystem 10b through the Internet or private line. In this structure, the user 1 may perform the electronic settlement or access the network-order-reception subsystem with the seller 5 using this user terminal.

Each of the seller terminal and user terminal is a general personal computer, PDA (Personal Digital Assistants) or cellular phone, etc.

Figure 15:
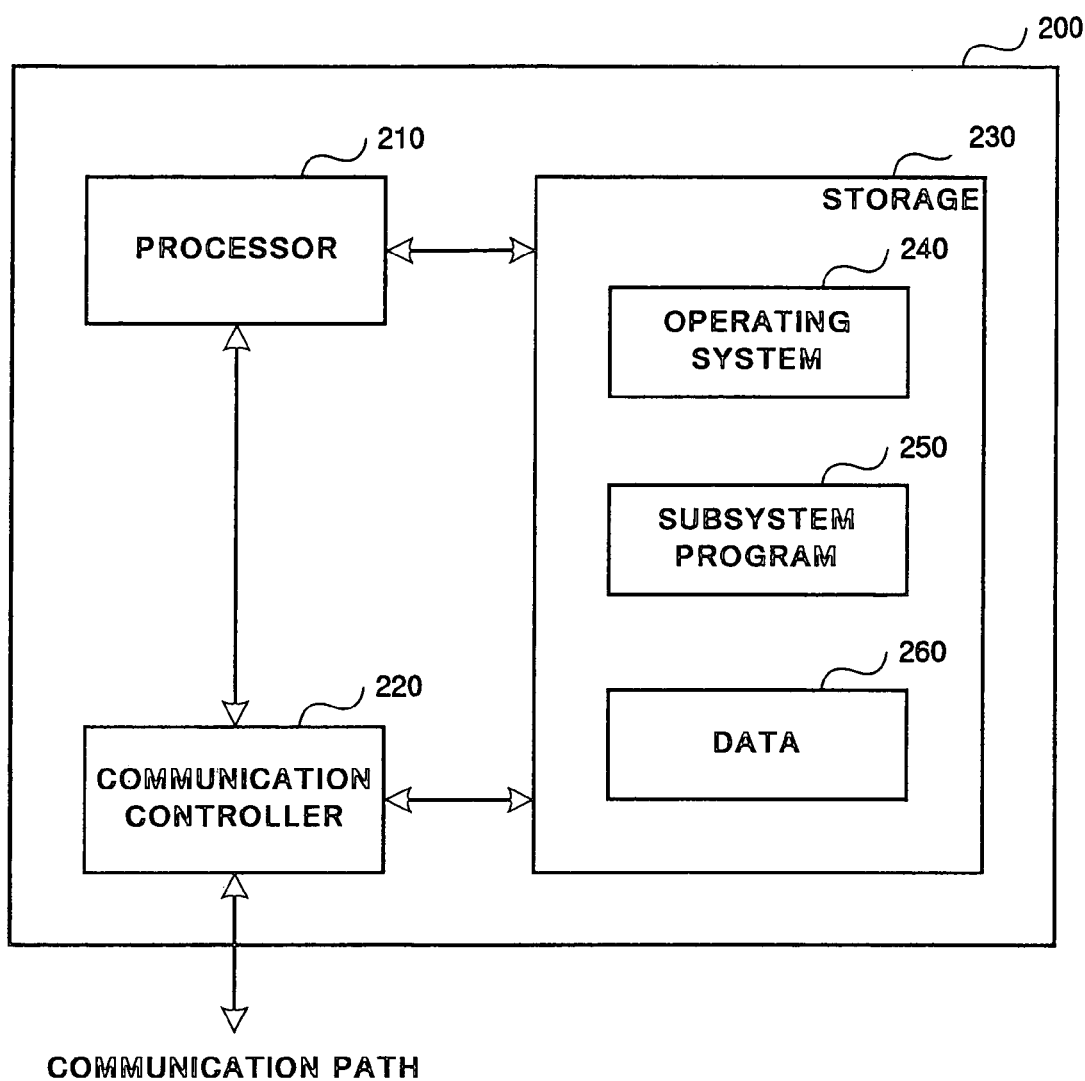
FIG. 15 is a diagram schematically showing the structure of a computer incorporated into the system of FIG. 14.

FIG. 15 is a diagram schematically showing a general computer 200 which is included in the above-described reception terminal device 20-1, the order reception management server computer 30 and delivery terminal device 40-1. As shown in FIG. 15, the computer 200 comprises a processor 210, a communication controller 220 and storage 230. The processor 210 controls the entire operations of the computer 200 and executes instructions written in the programs stored in the storage 230. The communication controller 220 is connected to a communication path, and controls data communications through communication lines. The storage 230 stores an operating system 240, subsystem program 250 and various data 260. The operating system 240 is a program for controlling operations of the computer 200. The subsystem program 250 is a program for realizing each of the subsystems, such as the order-reception subsystem, O/E subsystem, delivery subsystem, etc. Various data 260 are for use in executing various programs. The storage 230 further includes a main memory including a semiconductor memory, etc. and a secondary storage unit including a hard-disk drive, etc. The above-described programs are stored in the secondary storage unit, and read into the main memory from the second storage unit before executing each of the programs so as to be executed by the processor. For example, in the case where the computer 200 serves as the reception terminal device 20-1, the subsystem program 250 is to realize the order-reception subsystem. Similarly, in the case where the computer 200 serves as the order-reception management host computer 30, the subsystem program 250 is to realize the O/E subsystem. In the case where the computer 200 serves as a computer included in the delivery terminal device 40-1, the subsystem program 250 is to realize the delivery subsystem.

Several embodiments of the present invention have been described so far. The present invention can be realized, by a program for controlling a computer to execute the systems according to the embodiments of the present invention or a computer readable recording medium storing the program therein.

Specifically, as a recording medium recording the program or data for realizing the system of the present invention, there may be employed a CD-ROM, or a writable CD medium, such as a CD-R, CD-RW, a magneto-optical disk, a DVD-ROM or writable DVD medium, a floppy disk, any large-capacity floppy disk, a flash memory and any portable recording medium. The programs for controlling a computer to execute the functions of the system according to each embodiment of the present invention are recorded on any of the above recording mediums, and the recording medium recording the programs thereon is distributed, thereby enabling to realize the embodiments of the present invention. This recording medium is installed into an information processing apparatus, such as a computer, etc. to execute the programs recorded thereon. Otherwise, the programs are stored in a storage device included in the information processing apparatus and executed thereafter, so as to realize the embodiments of the present invention.

The programs or data for realizing the functions of the systems according to the embodiments of the present invention are downloaded into a storage device included in a computer through a network, such as the Internet, etc., and executed the downloaded programs, so as to realize the present invention.

A system involving the system for receiving orders for commodities and delivering the ordered commodities and also the order-reception system according to the above-described embodiments will now be described.

FIG. 16 is a diagram schematically showing a system for receiving orders for commodities and delivering the ordered commodities, according to the eighth embodiment of the present invention. This system is a system (hereinafter referred to as an ODES) for providing an ODES (Office Supplies Delivery Service) including a mechanism corresponding to various customer needs. In consideration of various customer needs, this system is prepared for the purposes of: (1) achieving the "one stop order" (reduction in the cost) of various manufacturer supplies and short delivery term; (2) establishing the reasonable prices; (3) providing user-friendly additional services; (4) changing the ordering method (easy ordering) from a telephone call into facsimile transmission or Internet through a Web page, etc.; and (5) purchasing and collecting of recyclable items due to environmental concerns. The ODES has the systems as follows:

the "one stop order" using a catalog issued at short period intervals (e.g. semiannually);

receiving of orders directly from customers at an ODES order-reception center;

direct nationwide delivery of commodities to customers within short term (e.g. the next day or on that day);

providing of a support menu (an additional service);

providing of information (the history of purchasing of commodities and the history of collecting recyclable items);

providing of customer information to seller;

purchasing various commodities including other companies' commodity (product) and keeping a stock of the various commodities;

correspondence to network-orders using a network service; and providing of customers with approximately 3,000 commodities at best-appropriate prices.

The system of this embodiment features as follows:

preparing a variety of commodities so as to enable the "one stop order" for the office supplies;

distribution of catalogs at shorter intervals than the case of conventional mail-order selling;

confirmation of orders received through phone calls, facsimile, etc., using a user-specified method (order response service);

not requirement of order-reception confirmation from users;

collection of used cartridge, bottles, etc. for free;

capability of purchasing new product supplies not shown in catalog;

capability of settling the price based on each user information;

capability of making orders 24 hours a day using a facsimile or Internet; and quick delivery of commodities.

Explanations will now schematically be made to a system according to the eighth embodiment of the present invention with reference to FIGS. 16A and 16B.

FIG. 16A is a diagram for explaining procedures to be processed by a seller 5 or supplier 9 (ODES) in relation to the user 1, and FIG. 16B is a diagram showing tasks of the seller 5 and supplier 9 (ODES).

According to the services done by the system of this embodiment, in the circumstances where commodities are sold directly from the vendor (vendor company), the seller 5 registers its users and sets the price of each commodity. Based on the ODES provided by the supplier 9, such as a manufacturer (vendor), etc., the system of this embodiment provides users with commodities, manages the stock of commodities, and creates and provides catalogs. Further, the system supplies the order-confirmation in a method requested by the user, for the order received therefrom through a telephone call, facsimile transmission or Web page. Additionally, for inquiries from the user 1, the system provides the user 1 with information regarding commodities or anything related to the purchasing. The customer information including the charge of payment is sent through the ODES to the seller 5. After the confirmation of the delivery, the seller 5 collects the charged amount of money from the user 1, takes out the charge for the sales, and pays the rest of money to the supplier 9. Those procedures done by the supplier 9 and seller 5 may be performed either the supplier 9 or seller 5. The best way to arrange the procedures between the supplier 9 and seller 5 depends on the backbone of the local network of the corresponding company. To evolve the ODES service, it is necessary to expand the variety of commodities based on the market demand and to expand the OA supplies, stationary goods, etc.

FIG. 17 is a diagram for explaining a membership registration processing carried out in the ODES shown in FIG. 16A. Explanations will now be made to the system of the ODES with reference to FIG. 17.

The seller 5 has a business talk with the customer (the user 1) and decides the price of a target commodity to be sold. After the business talk the user 1 fills in an application form. The seller 5 accesses a HOST/OE system 3a to register the user 1 having filled in the application form, into a customer master DB 63 of the business management system (sets a flag indicating an ODES member). At the same time, the HOST/OE system 3a registers the individually or totally the prices in a price DB 64. The HOST/OE system 3a corresponds to the O/E subsystem 3, while an ODES terminal 66 and a catalog creating/sending section 67 of an ODES inquiry center 65 correspond to the business management subsystem 6 included in the system of the above-described embodiment. The customer master DB 63 and the price DB 64 correspond to the user-information database 61 included in the system of the above-described embodiment, and may be combined with each other so as to form a single database, and sends the application form to the supplier 9 via facsimile. The supplier 9 confirms whether there is a corresponding member flag, creates an order sheet for members, performs pre-printing of user information, and registers credit buy limit of the user. Just on the day the application form is transmitted via facsimile, the supplier 9 directly sends a catalog, an order sheet, a greeting letter, etc. to the user within two to three days.

A mail-order selling method employed in the ODES shown in FIG. 16 will now be described. In the case where the user makes an order for commodities using the ODES, the user refers to the catalog, writes down a desired commodity in the order sheet, and sends the order sheet via facsimile. The supplier 9 receives the order via facsimile (available for twenty four hours a day), and automatically sends a facsimile representing the delivery information ten minutes after the reception of the order. When to inquire of the ODES inquiry center, the user uses the generally-used telephone or fax, so that the ODES inquiry center can always respond to the user inquiry. This realize the "one stop order" using the catalog. The user can make a direct order for commodities using an order sheet. Further, all inquiries to be made by the user can be handled by the supplier. The seller has nothing to do with any orders and inquiries made by the user. Thus, there are several advantages that there is a reduction in the tasks required for receiving orders, a reduction in the tasks required for responding to the users, and a reduction in the tasks for managing the stock (ordering tasks/stock managing), etc.

One example of support tools when using the ODES will now be explained.

As user-supporting tools with charge, there are prepared a catalog showing the entire contents of the ODES and an ODES introduction pamphlet (suggestion pamphlet) condensing the contents of the catalog. As a user-supporting tool for the manager or service assistant, customer engineer of the seller or delivery company, there is prepared an application form for ODES members, in addition to the above-described suggestion pamphlet. The cost for delivering the above catalog to the user may be done free. Any other expenses concerned would include the cost for delivering product items to the users or the cost for substitutionally carrying out the order-reception processing in place of the seller. The cost for substitutionally carrying out the order-reception processing is necessary when the seller intends to sell commodities purchased originally using the ODES. In the case where the manufacturer or supplier asks the seller to have a business talk with the user or collect the money from the user using the ODES, the manufacturer or supplier charges an amount of money including the charge for the assigned work to the seller, and the seller afterwards charges the total amount of money to the user.

As a free user-support tool for users, there are prepared a FAX order sheet as an order sheet for making an order for commodities, estimation software for printing a estimated cost for each category of commodity for each customer, and a database served on a Web page for providing any other commodities, etc. As a free user-support tool for the manager, service assistant, customer engineer of the seller or distributor, in addition to the above-described estimation software and database, there are prepared a brief ad toward users, a service assistant manual showing the entire contents of the system using the ODES and a database (ODES sales information DB) for providing the service assistant manual, proposal or sales cases.

Figure 18:
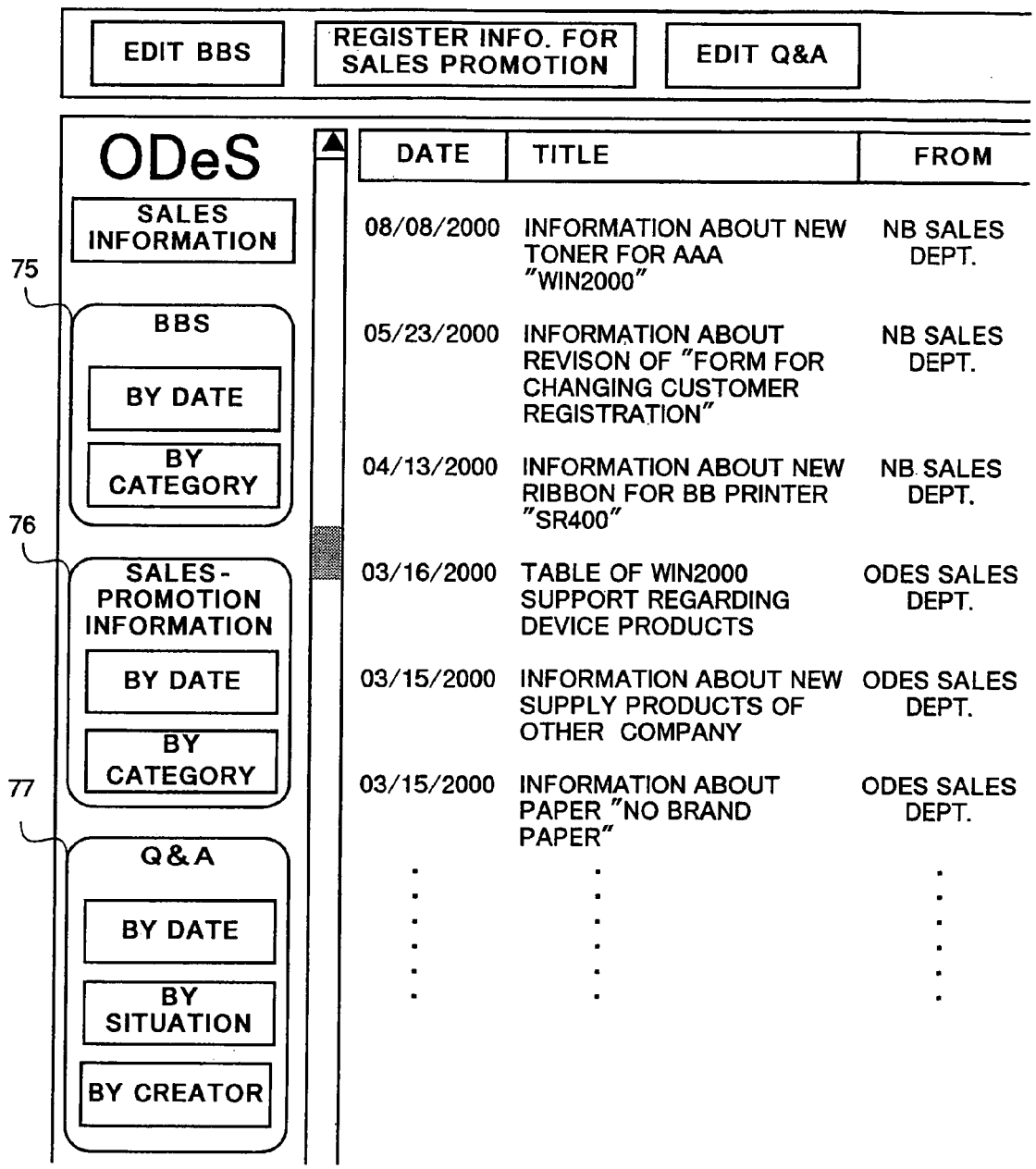
FIG. 18 is a diagram showing an example of a display page showing a sales-information database in the ODES.
Figure 19:
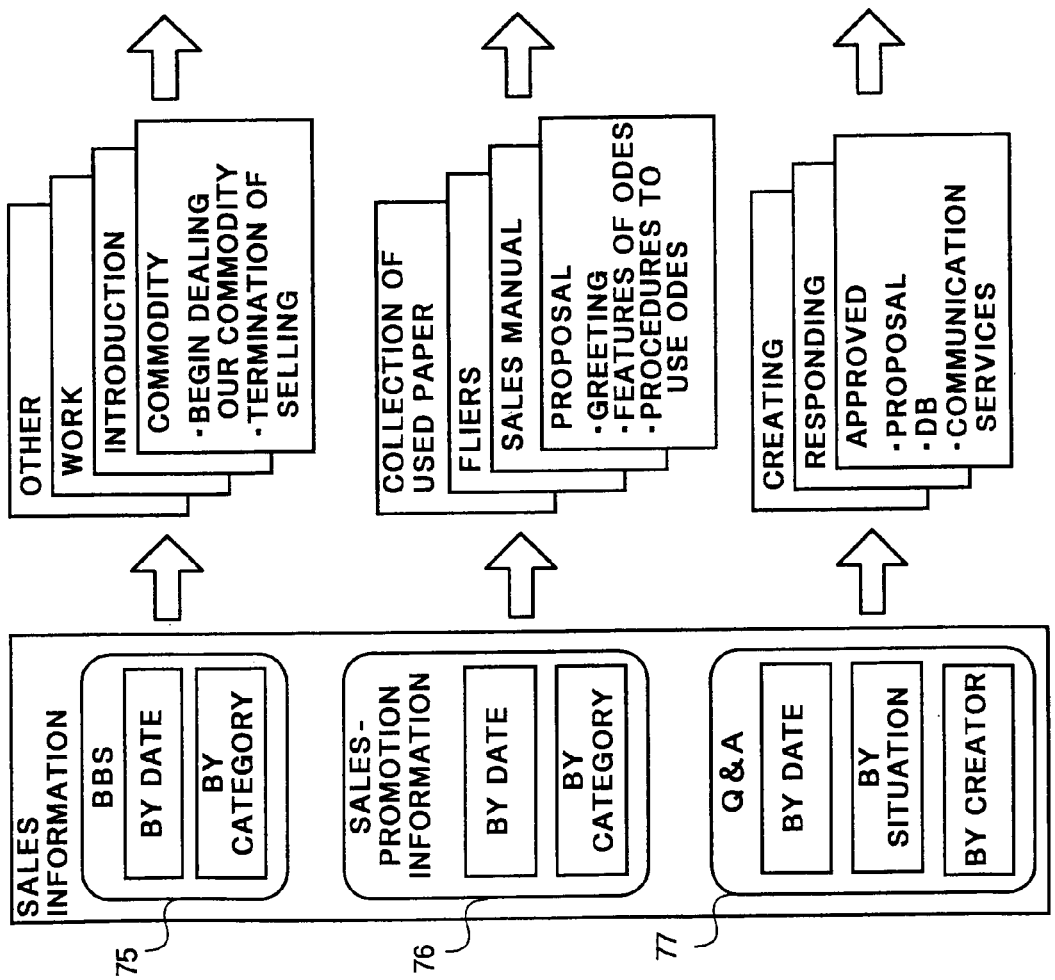
FIG. 19 is a diagram for specifically explaining the sales-information database.

Explanations will now be made to the sales information database for use in the ODES, with reference to FIGS. 18 and 19. FIG. 18 is a diagram showing an example of a display page for the sales-information database, and FIG. 19 is a diagram for specifically explaining the sales-information database. The ODES sales-information database is stored in a folder in a server computer of a company. As shown in FIG. 18, the ODES sales-information database stores: information to be posted on a BBS style page 75 according to date and classification; information to be displayed as sales-promotion materials 76 according to date and classification; and inquiry information to be displayed as Q&A (Questions and Answers) 77 according to date, context, and maker. These information is displayed in the form of display page shown in the form of a display page as illustrated in FIG. 18. The information to be posted on the BBS style page 75 is registered through the ODES, and used mainly by the seller. Several information items of "start dealing other companies' commodities", "presentation of own commodity", "end of sales", etc. are collected and displayed on the BBS style page in the category of "commodity". Any other categories include "information", "task" and "other". As helpful information, there is a note "We show information from ODES, please refer commodity information, general information, business information classified according to date or category for your business interests". The information to be displayed as the sales-promotion materials 76 is registered through the ODES, and mainly used by the seller. Several information items of "greeting", "features of ODES", "procedures for using ODES" are gathered in the category of "proposal". Any other categories may include "sales manual", "ad", "collection of used paper". As helpful information, there is a note "We show sales-promotion information, such as proposal for ODES, sales manual, ad, etc. You can refer the information according to date or category, so print and refer to the information for your business interests". The information to be displayed as Q&A 77 is created by the ODES and seller upon reception of questions from the user and seller, etc. Specifically, the ODES receives the questions from the user and seller, the person in charge of this responds and recognizes the questions, and the ODES and seller use the information to be displayed as Q&A 77. Information regarding some items of "regarding proposals", "for DB", and "for reply services" are set in the Q&A information in the category of "recognized information". Other categories in the Q&A include "being responded", "being created", etc. For these categories of "being responded" or "being created", there is a note "We accept questions or requests regarding ODES, and you can refer information according to date, situation, creator, etc.".

Explanations will now be made to an example of a distribution system in which the ODES is employed.

The company arranges a new stock place for distribution for its own supplies (commodities), and supplies users with items desired by the users. As the distribution service standard, the deadline times for receiving orders are set at 10:30 (morning) and 15:30 (afternoon), and may be extended in accordance with the user's request. Otherwise, there may not be the deadline time. Further, as the distribution service standard, for several big cities (areas), the location/time (L/T) to deliver is automatically set as "on that day of order-reception", and any additional services are provided. For any other cities (areas), the location/time (L/T) is set as "on the next day of order-reception", and the additional services are partially provided. For commodities that are important strategically in ODES(for example, loss leaders), other companies' supplies, media supplies, users are supplied with commodities from special stock places especially for ODES prepared in several places within a country. In this case, as the distribution service standard, for the several big cities (areas), any additional services are provided. On the other hand, for any other cities (areas), the additional services are partially provided. For both, the location/time (L/T) is set as "on that day of order-reception", and the deadline time for receiving orders is set at or after 16:30. For OSO (one stop order) supplies (supplies of PCs), the stock place of the vendor is set as the distribution base, and commodities are distributed to users from the stock place. As the distribution service standard, the location/time to deliver is set as "the next day or day after next day of order reception (the deadline time for receiving orders is set at 11:00). If the service is set on way, those stationary goods or the like may be included in the commodities to be sold. In this case, the distribution base may be the special stock place especially for ODES or may be a place of a company, etc. having alliance with the corresponding company.

ODES free the seller from the distribution procedures from receiving an order for a commodity up until the delivery of the ordered commodity. The delivery charge may be calculated based on the total price to be charged by the ODES to the seller, or regardless of the total price of the purchased items. For example, the user needs to pay the delivery charge only if the total price of an order is equal to or less than a predetermined amount of money, and the user does not have to pay the delivery charge if the total price of an order is equal to or more than a predetermined amount of money.

The ODES is mainly a mail-order selling service for enabling the "one stop order (one time purchase)" for purchasing expendable supplies related mainly to OA apparatuses. The method for making an order for commodities through the ODES may be either one or both of: (1) filling in an order form and sending the filled order form through FAX; and (2) ordering for commodities through the Internet. Furthermore, the ordering may be done by a telephone call or e-mail. For example, the commodities to be provided may include: many kinds of paper in accordance with various usage; environmental-friendly commodities; toners of various manufacturers (for copier, fax, printer, etc.); attachments of a personal computer (such as a mouse, MO, CD-R/RW, etc.); a device (PC card, SCSI board, etc.); and software products (operating systems for personal computers, various utility software programs, etc). It is preferred that stationary items be also sold, instead of just selling only the OA machines and instruments. For example, such items to be sold are: office living needs including water, soft drinks, paper cups, cleaning equipment, sweets; stationary items including files, notes, paper items, pens, glue, hole puncher, elastics; OA supplies including papers to be copied or toners; and computer-related items including mediums like MO, CD-R/RW, floppy disk, computer cable, adapter, mouse, etc. Additionally, the items to be sold include: office electric appliances (large items) including shredders, timer recorders, films, cameras; office electric appliances (small items) including calculators, batteries, etc.; office furniture including desks, chairs, book shelves; services for creating business cards, printing addresses and names on envelops, creating stamps, dumping classified documents, gas/water service meter, making uniforms, travel arrangement, and maintenance services for apparatuses or systems, learning curriculums for system operation training and so on, lease/financial service, insurance business for machines, computer system and so on.

Further, in the ODES, used cartridges or bottles are collected in the same manner as the delivery of commodities. It is preferred that this collection be done for free. There may be any other services; such as a service for specifying the delivery date; a service for placing a delivered commodity on a specified shelf; a service for delivering unwrapped item or collecting employ boxes; a service for confirming in advance the stock of a corresponding commodity or for making an order for the commodity; a service for cleaning up an area where one or more copiers are installed; and a service for collecting used paper.

In the ODES, except those orders of telephone calls, the ordering can be done twenty four hours a day regardless of the business hours of the store (company or the like from which the target commodities are to be purchased). The ordered commodities can basically be delivered on the next day of the order reception. By using any one of the above services, there can be prepared the user-friendly shopping environment. By using the ODES, there is needed only one receptionist because of the reduction in the work. In other words, there is needed only one place to purchase, inquire, contact, so that only one kind of bill is issued to the user. The used toner cartridges, bottles, etc. will not be dumped into garbage, because they will successfully be collected after use. That is, the user does not pay the service charge for requesting a dumping company to dump such cartridges or bottles, or proceed for sending back the items to be dumped to the manufacturer. Because the support menu is provided, there is a reduction in the work for the expendable supplies. In this case, the user does not have to through away the employ boxes or bring the items to be dumped into their stock space.

Explanations will now be made to the support contents in the ODES.

The support contents are described in the introduction pamphlet of the ODES in the above-described support tool. As the service (providing support) for collecting used items, there are services for collecting the used cartridges, toner containers, used papers, etc. The service for collecting the toner containers and the service for collecting the cartridges are done for free, and are done for collecting the user's copier, printer, facsimile machine, toner container, cartridge, etc. when delivering a newly-purchased commodity thereto. According to the service, not just those commodities purchased from the corresponding company, but also commodities purchased from any other companies can be collected. According to the service for collecting used paper, the customer is to purchase a used-paper collection box, for example. If the used-paper collection box is filled with used paper, the box containing used papers therein is collected at the time of delivering a commodity so as to recycle the used paper. Other services which can be provided at the time of delivering the commodity ordered are: a service for delivering commodities ordered in a specified place; a service for delivering unwrapped items ordered, and collecting empty boxes; a service for replacing commodities (FIFO), and the like. According to the service for delivering commodities ordered in a specified place, the ordered commodities can be delivered to a specified place (e.g. a storehouse, basement, etc.) for free at the time of sending the items. According to the service of the unpacking delivery and collecting empty boxes, the commodities are unpacked when delivering and the boxes for packing the commodities are collected. This can be done for free or can be paid for. According to the service for replacing commodities (FIFO), commodities in stock are replaced from one to another so that old items, like diazo paper or the like, can be taken out when delivering ordered commodities. This can be done for free or can be paid for.

Those services to be provided in relation to the delivery date are: a service for delivering commodities on a specified date; an urgent delivery service; and periodic delivery of a constant number of specified ordered commodities. According to the service for delivering commodities on a specified date, commodities are delivered on a specified date. This can be done for free for any dates until the end of next month, for example. According to the urgent delivery service, ordered commodities are shipped and delivered immediately after reception of an order, in the case where the commodities are needed soon. The order for this service should be made the deadline time therefor, and should be paid for, for example. According to the periodic delivery of a constant number of specified ordered commodities, the user decides the desired commodities, place to deliver, the number of ordered commodities, delivery date and the like in advance, so that a pre-set number of commodities can be delivered. Except the periodic delivery of a constant number of specified commodities, users can make orders for commodities by filling in a later-described order-sheet. The periodic delivery of a constant number of specified commodities can be specified in the order sheet or can be accomplished every time an order is made.

Figure 20:
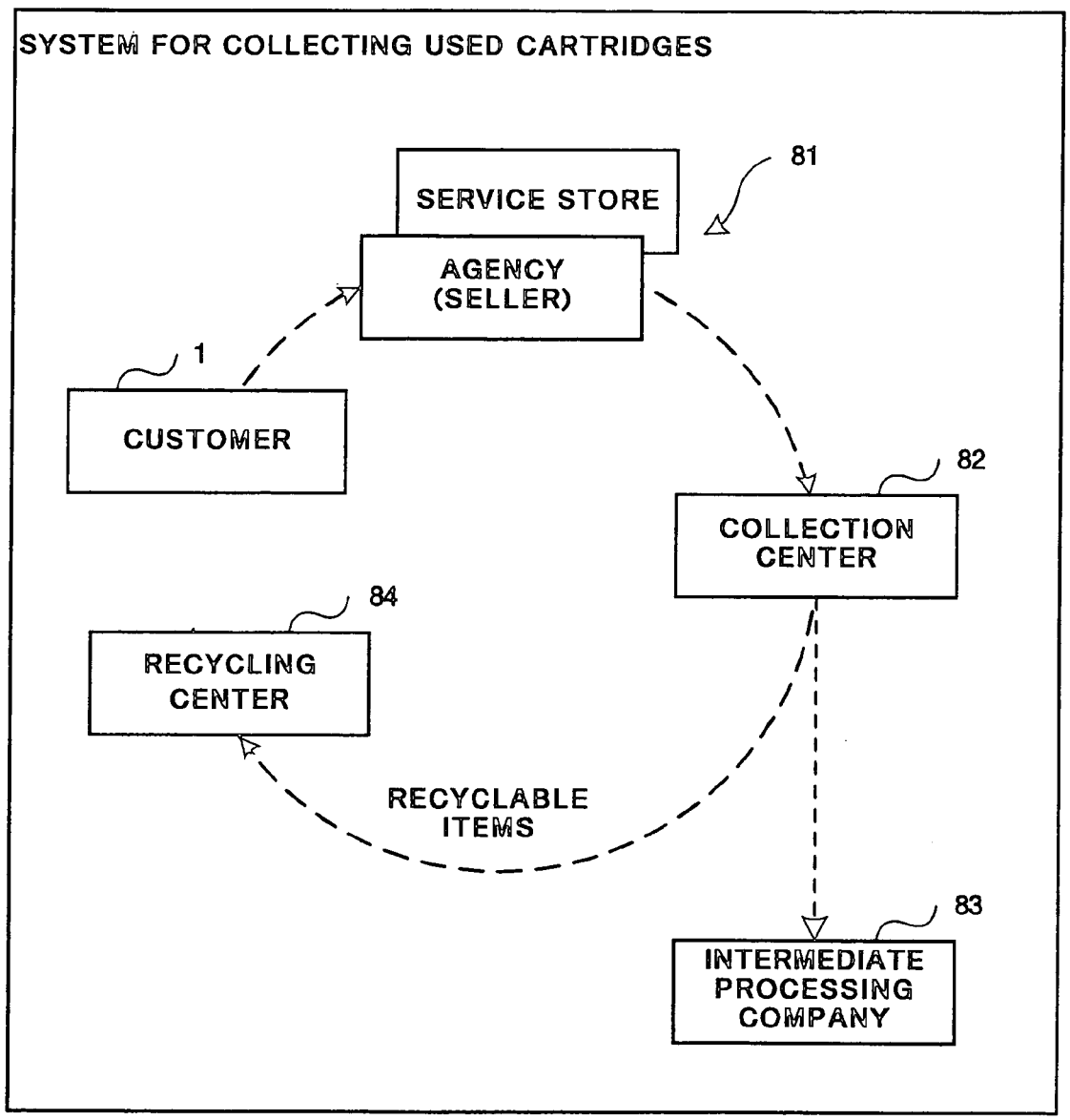
FIG. 20 is a diagram for explaining a used-cartridge collection system.

A used-cartridge collection method will now be explained with reference to FIG. 20. In FIG. 20, a customer (user) 1 provides an agency or service store 81 with a used cartridge. The agency or service store 81 sends the provided-used cartridge to a collection center 82. The cartridges which can not be recycled are sent from the collection center 82 to a intermediate processing company 83. Any of those recyclable items are sent from the collection center 82 to a recycling center 84 so as to be recycled, thereafter being sold to the user 1. Basically, the collection of the recyclable items are collected, and can also be collected at the service store. The collection of the recyclable items are performed mainly by both sales and service sections. In the case of collecting used cartridges or used photo conductors, the user informs the seller (store from which the user has purchased the cartridge) of the date for collecting the item. This cartridge can be collected by the staff of the store.

In the case of collecting used cartridges and used photo conductors, the staff of the agency or service store puts wrapping boxes into a collection box to be temporarily kept therein. If the collection box is filled with the wrapping boxes, it is sealed with a tape. In the case of collecting used toner containers, the staff of the agency or service store puts the toner containers into a box so as to temporarily be kept therein, and keeps a slip for collecting the toner containers. The service store provides the seller with the collected used cartridges. The service stores of a corresponding manufacturer may collect used cartridges manufactured thereby, but may not collect any other manufacturers' cartridges.

The empty boxes of paper may be collected together with the used papers, but are not basically collected. The used expendable supplies are office-waste, and can be collected under the control of the local government. The used containers after collected are recycled (in its entire form or parts of the containers) or broken down into materials or fuel.

FIGS. 21 and 22 are diagrams each showing an example of a user application form of the ODES when to register the user. Specifically, FIG. 21 shows a slip of the user application form which is to be submitted to the ODES, while FIG. 22 shows a ship of the user application form which is to be kept by the seller.

As shown in FIG. 21, the user application form shows spaces for writing several information items, such as date, phone number and fax number of the customer, e-mail address of the staff in charge of making an order, customer name, section name (in case of corporation), name and signature of the staff in charge of this case, name and signature of the staff in charge of making an order, and the place to delivery the ordered commodities. In addition to the above, there are also a space for writing names of the commodities which are frequently ordered by the customer and a space for writing the seller and the staff in the charge of this. The space for writing the names of the commodities which are frequently ordered by the customer are divided into smaller spaces for writing the commodity names, the commodity number and the price of the commodity. Likewise the normal mail-order selling, there are spaces for writing: the customer code for managing the customers; desired delivery pattern; payment condition and payment method, distribution method of distributing catalogs (whether the catalog is brought by the seller or sent through the ODES); information representing whether the customer has already been registered in the business management system; and a special note representing the delivery condition or the like.

As illustrated in FIG. 22, the user application form to be kept by the seller includes not only the spaces shown in FIG. 21, but spaces for the customer profile and scale of the customer (the number of persons in the customer enterprises) to be written by the sales person. The space for writing the customer profile is to write information regarding the seller from which the customer used to purchase commodities before he/she uses the ODES. The sales staff writes the previous seller of the customer, selecting from Internet sales services, stores, mail-order selling, visiting sales, etc.

Figure 23:
FIG. 23 is a diagram showing an example of an order sheet used for using the ODES.

FIG. 23 is a diagram showing an example of an order sheet used for using the ODES. On the ODES order sheet, other than those spaces for writing the ordered commodity, there are several spaces for writing: the customer name; the customer code; the customer phone number; the place to deliver; the addressee phone number; the staff in charge of ordering; and the order number. Those spaces regarding the ordered commodity are prepared for the commodity code, the commodity name and the number of the ordered commodities. The commodity code or commodity name of frequently-ordered commodities may in advance be printed on the ODES order sheets. The customer can designate any other item from the support menu to be done in the ODES and the desired delivery date, in addition to the commodity code of the ordered commodity, the commodity name, the number of ordered commodities the unit of the commodities. Other items included in the support menu are: unpacking delivery and collecting empty boxes; FIFO; and placing the ordered commodities onto a specified rack, and these items are shown on the order sheet in association with their corresponding charge.

Explanations will now be made to the relationship between the ODES and a network-order subsystem (hereinafter referred to as a NetService) 8 which employs a network, such as the Internet, etc. Until orders for supply commodity shifts to the network-order selling on a full scale, the paper-catalog order selling using the ODES is used as an alternative for the network ordering. Hence, until the customer finishes constructing its infrastructure of Web ordering through Internet and the search ability of the network-order selling is satisfied, both the ODES and NetService coexist. The user registration, order reception and inquiry of information are done individually by the ODES catalog mail-order selling and NetService. However, it is preferred that the commodities on sales and the infrastructure for distribution are the common between the two different sales methods. The network order selling is multi-channel type selling which includes: an internet business including an ASP (Application Service Provider) service, an information providing service, a network connection service and a distribution service (for supplying machines, computer related items, OA items); a visiting sales method; and a call center which receives orders by telephone calls. While the NetService is the multi-channel type selling using the electronic catalog, the ODES catalog is the mail-order selling using paper medium. As the corporation develops, it is better to commonly share the same commodities between both of the selling techniques. The members of the ODES may join the network selling, in the case where the environments of the network order selling are settled. On the contrary, the members of the network order selling may join the ODES, in the case where the members wants to give orders through the Internet after searching some commodities on the paper catalog, or in the case where the network order selling is not allowed within the organization of the members. In the NetService, those OS supplies (own companies or other companies') or computer related supplies are dealt in addition to laser printers, personal facsimiles, digital cameras, CD-R/RW, etc., so that those who join both the ODES and NetService can make orders the commodities dealt by the ODES using the NetService.

Figure 24:
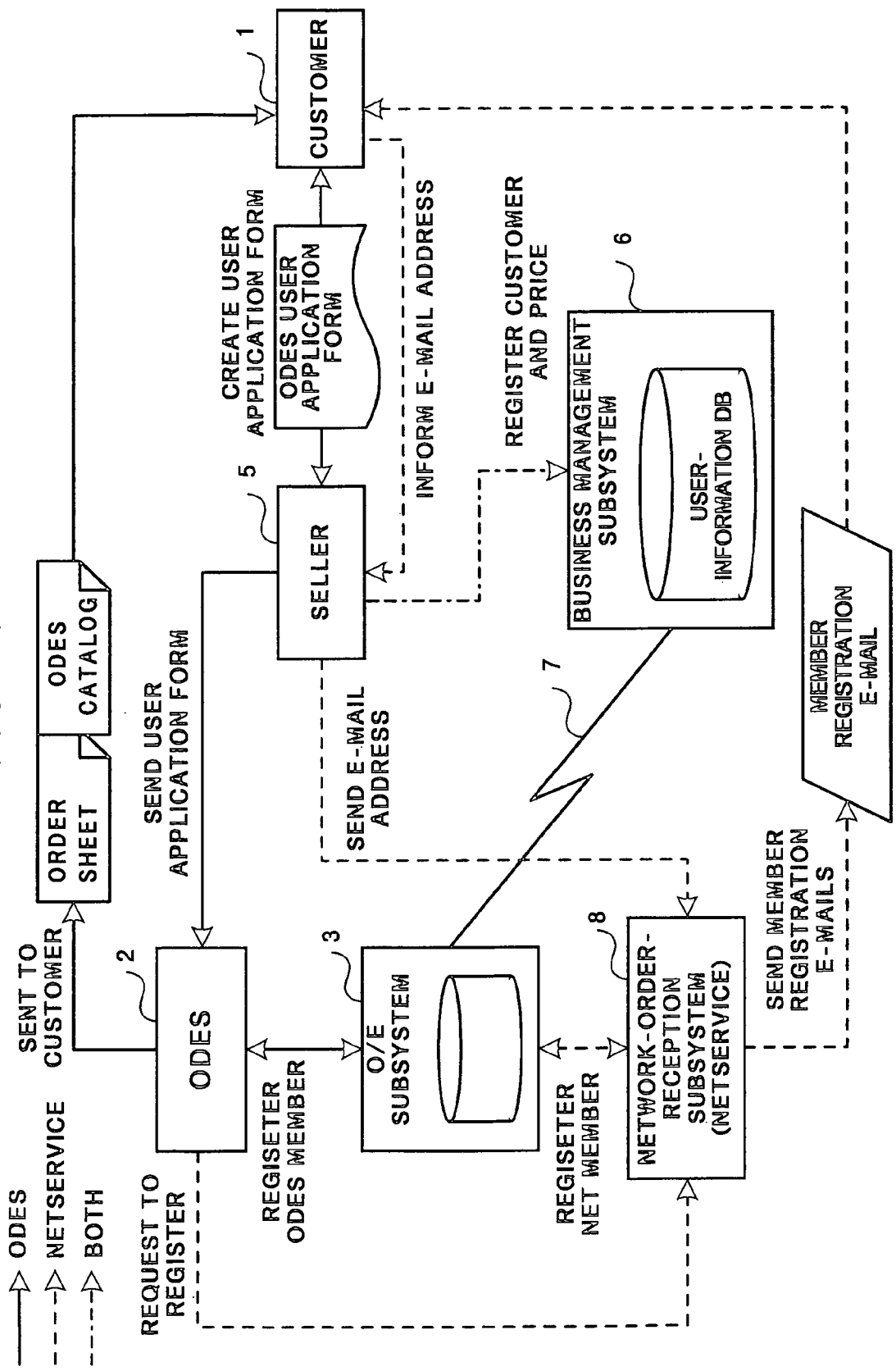
FIG. 24 is a diagram for explaining the flow of member registration for registering members into the ODES and NetService.

Explanations will now be made to the flow of a member registration of the ODES and NetService, with reference to FIG. 24. The ODES user application form is created by the seller 5 and user 1 (customer). Then, the seller 5 registers, in the business management subsystem 6, the customer and total price of the commodities purchased by the customer. In the case where the user gives the seller 5 his/her e-mail address, the seller 5 sends the sent e-mail address to the NetService 8. The NetService 8 registers the customer, and sends a NetService member registration e-mail to the customer. Further, the NetService 8 creates an ODES user application form for registering the customer to the ODES, and sends the created user application to the ODES 2. The ODES 2 registers the customer as an ODES member and sends a catalog and an order sheet to the customer. In the case where an e-mail address is written in the application form, the ODES 2 requests the NetService 8 to register the user as a member.

Figure 25:
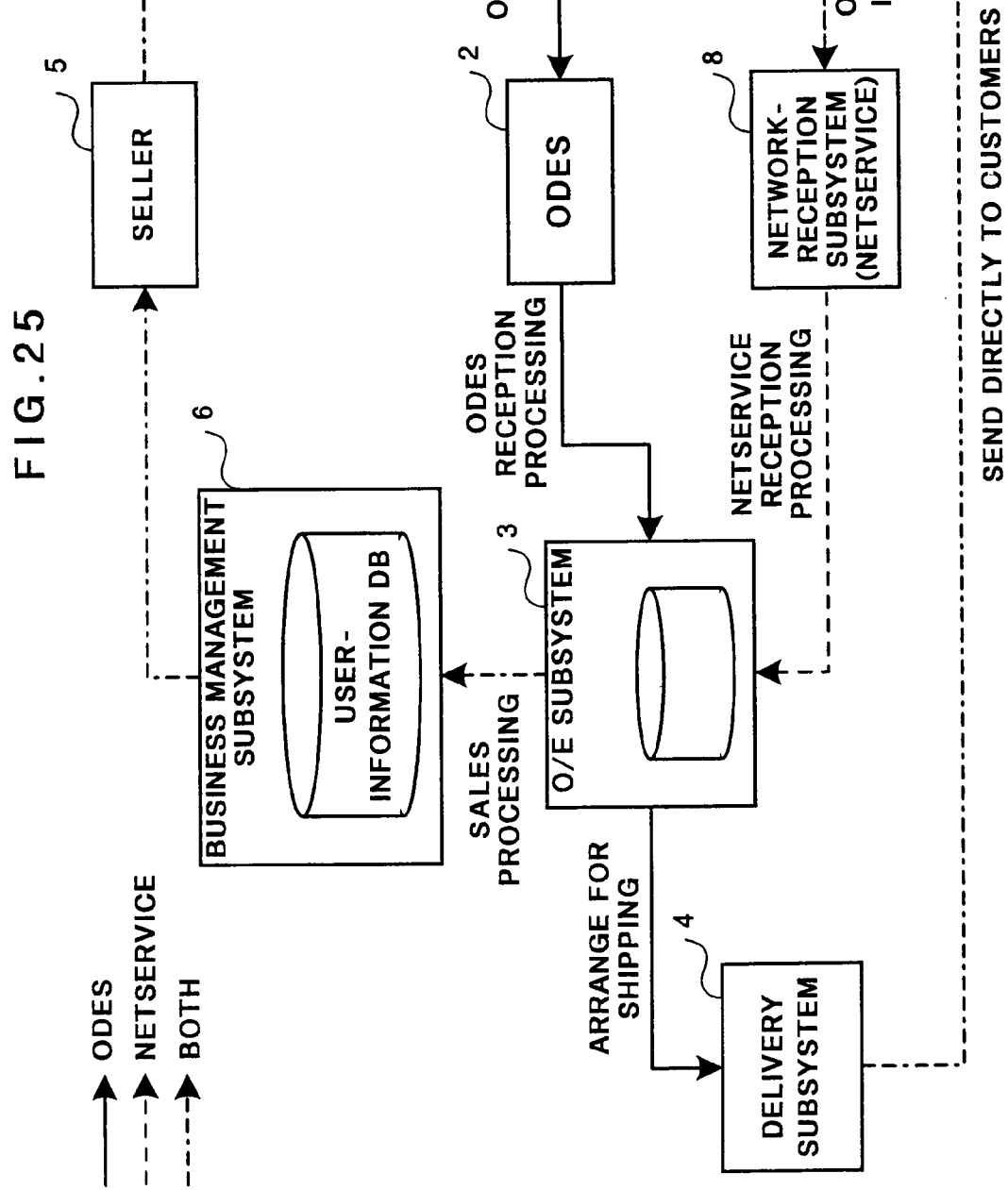
FIG. 25 is a diagram for explaining the flow of a receiving orders for supplies and delivering the supplies ordered through ODES and NetService.
Figure 27:
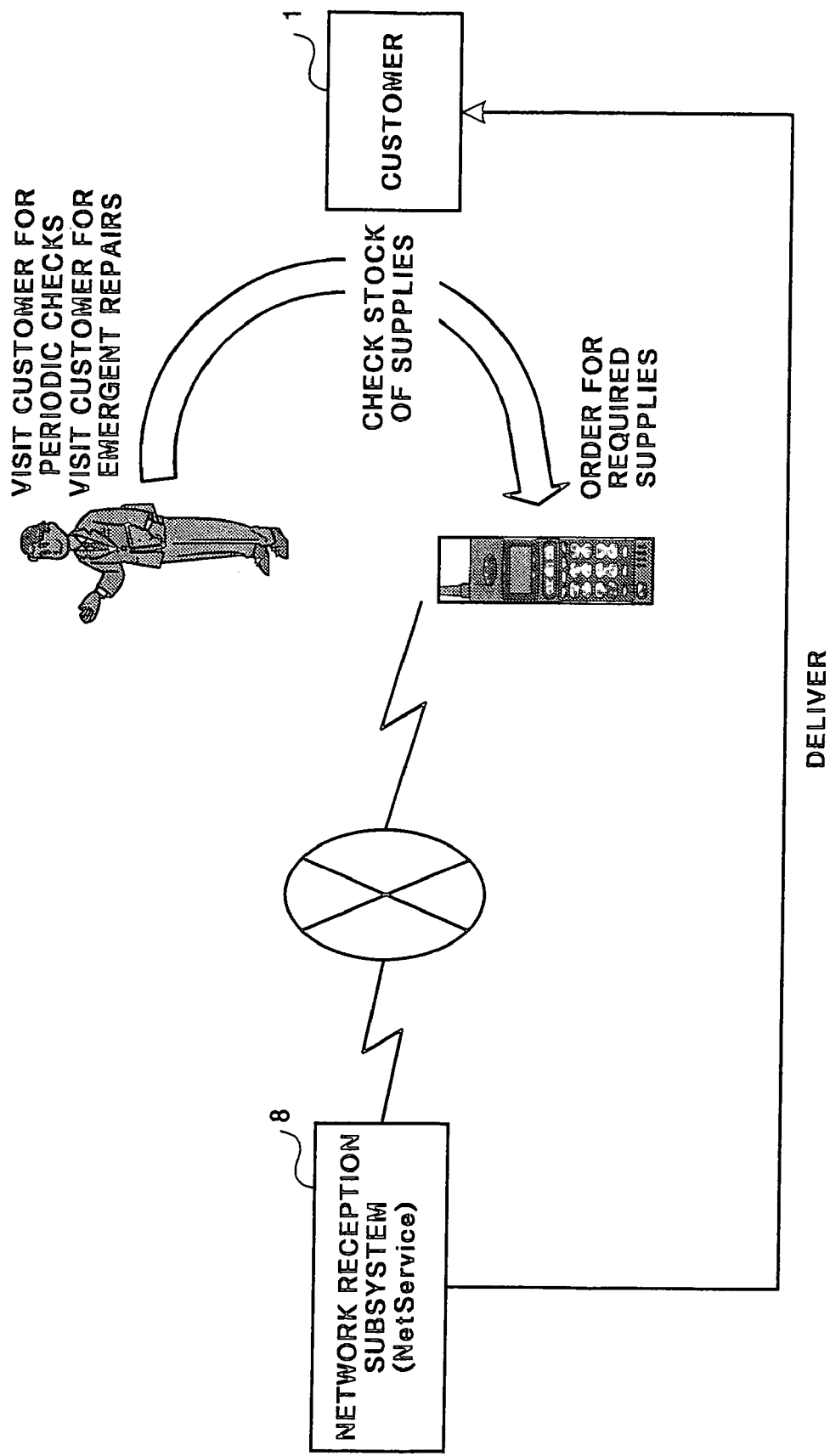
FIG. 27 is a diagram for explaining a service for giving an order for commodities and checking a stock of the ordered commodities, using a cellular phone.

Explanations will now be made to the flow of receiving orders for commodities and delivering the ordered commodities through the ODES and NetService, with reference to FIG. 25.

If the ODES member 1 makes an order for commodities via FAX, the ODES 2 carries out a processing for receiving the order. If the NetService member makes an order for commodities through the Internet, the NetService 8 carries out a processing for receiving the order. Upon completion of the order reception processing, the O/E subsystem 3 requests the business management subsystem 6 to perform a sales processing, and sends the delivery subsystem to ship the ordered commodities. The delivery subsystem 4 directly sends the arranged commodity to the user. The business management subsystem 6 requests the seller 5 to collect the payment, and the seller 5 collects the payment from the user 1.

According to long-term perspective point of view, before setting another order-reception style (Web/call center), orders are received via FAX using the ODES. After this, the procedures for combining the ODES and NetService are carried out. Then, orders can be received through telephone calls after the settlement of the call center, and hence decreasing the order-reception tasks of the sales staff. In the case where it is desired to receive more orders through Web pages, it is necessary to provide some services, such as a point calculation service, a Web discount, an easy ordering method, etc. which may fascinate users so much as to switch to the Web ordering.

In addition, it is necessary to provide various ordering methods (multi-channel), regardless of growing in Web ordering rate. Further, in the future, it is definitely necessary to integrate the strategy, organizations, processes and systems of an after-market business as a whole, for the plurality of ordering methods, by consideration independent from the difference between the ordering method. If the integration of the various ordering methods is considered important, such business may develop very slowly. Therefore, it is a realistic approach to develop such business within the extent that satisfaction of customers does not decrease, and proceed activities toward the integration in parallel.

FIG. 26 shows an example of customer (user) information of the ODES.

The customer information includes: (1) sales information by customer; (2) sales information by depot; (3) information regarding received orders by customer; (4) sales information and account for acquiring toner sold by other companies; (5) purchase history of each customer; (6) ODES sales and gross margin information; (7) sales information by commodity group; (8) information regarding the number of accounts for making orders and regarding the total number of orders made by customers; (9) information regarding new supply commodities (sold by both of the corresponding company and other companies); (10) customer claiming information (including (5)); (11) customer inquiry information; (12) new machine information (sold by the corresponding company); and (13) other information. Based on this customer information, the seller can have developed plans for selling more commodities, and the customers are more willing to purchase supplies. In this manner, the plans for selling supply commodities are developed.

Explanations will now be made to a service for making orders after checking the stock of target commodities, with using a cellular phone. Recently, the cellular phones have remarkably spread, so that it should surely be commonplace for each person to own a cellular phone. Besides, it is common that the cellular phone can be connected to the Internet, thereby various information could be transmitted and received using the cellular phones. The cellular phones are the center for transmitting and receiving information. Using such a cellular phone employed as a supply ordering means, the service for making orders after checking the stock of the target commodity can be realized. In order to reduce the work of service assistants while focusing on selling machines, there is employed a development method for examining effectively using the customer engineers. When the customer engineer visits the customer for periodic checks or emergency repairing, the customer engineer checks the stock of the supplies, and makes an order for the supplies using a cellular phone. Based on a method of making an order for the supplies, the customer enginneer connects the cellular phone to the Internet to access the NetService 8. Then, the customer engineer arranges the supplies to be delivered to the customer through the NetService 8. Otherwise, the customer engineer informs the user (customer) of the supplies to be ordered so as to suggest the user to make an order for the supplies using the NetService 8.

The system of the present invention can be realized by a general computer, without the need for a dedicated system. A program and data for controlling a computer to execute the above-described processings may be recorded on a medium (a floppy disk, CD-ROM, DVD or the like) and distributed, and the program may be installed into the computer and run on an OS (Operating System) to execute the above-described processings, thereby achieving the system of the present invention. The above program and data may be stored in a disk device or the like in the server side device on the Internet, and embedded in a carrier wave. The program and data embedded in the carrier wave may be downloaded into the computer so as to realize the system of the present invention.

Various embodiments and changes may be made thereonto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2000-374376 filed on Dec. 8, 2000, and including specification, claims, drawings and summary. The disclosure of the above Japanese Patent Application is incorporated herein by reference in its entirety.

What is claimed is:

1. A method of receiving and handling an order from a customer using an order-reception system which is comprised of at least one computer and has an order-reception subsystem, business management subsystem and order-entry subsystem, comprising the steps of:

registering, by the order-entry subsystem, user information designating a user having filled in an application form, into a database of the business management system with a flag indicating membership of the user;

registering, by the order-entry subsystem, price information designating a price of a commodity, in a database of the business management system;

registering, by the order-reception subsystem, sales-promotion information to be displayed as sales-promotion materials and inquiry information to be displayed as Question and Answer (Q&A) information;

storing, in a sales-information database by the order-reception subsystem, Bulletin Board System information to be posted on a Bulletin Board System style page according to date and classification, the registered sales-promotion information to be displayed as sales-promotion materials according to date and classification, and the registered inquiry information to be displayed as the Q&A information according to date, context, and maker;

displaying, by the order-reception subsystem, the Bulletin Board System information on the Bulletin Board System style page;

displaying, by the order-reception subsystem, the sales-promotion materials;

receiving, by the order-reception subsystem, customer order information sent from the customer, said customer order information including customer information regarding the customer and at least one of ordering information representing contents of an order for a commodity ordered by the customer and support request information representing contents of a support request;

performing, by the order-reception subsystem, the order reception processing based on the received customer order information;

determining, by the order-reception subsystem, to deliver the commodity specified in the ordering information and to provide a support specified in the support information, based on a result of the order reception processing;

confirming, by the order-reception subsystem, whether the commodity is delivered and the support is provided; and charging, by the order-reception subsystem, a price of the commodity specified in the ordering information and a cost of the support specified in the support request information, based on the customer information including information regarding a price of each commodity purchased by the customer with high frequency and a cost of each support requested by the customer with high frequency, wherein the price and the cost are set by a seller of the commodity and support;

wherein the support request information includes information regarding a request for at least one of:
- a service for delivering the commodity to a place specified by the customer;
- a service for unpacking the ordered commodity at a time of delivery;
- a service for collecting an empty box that the customer does not need any more;
- a service for delivering commodities that are repeatedly supplied to the customer on a FIFO basis;
- a service for specifying a delivery date for delivering the commodity to be delivered;
- a service for urgently delivering the ordered commodity; and
- a service for periodically delivering a constant number of commodities specified by the customer;

wherein the support request information includes information regarding a request for collecting recyclable items including at least one of a used cartridge, a used toner container and used paper, and wherein the order-reception system is further comprised of a delivery subsystem;

the method further comprising the step of arranging, by the delivery subsystem, collection of used paper, in response to a support request for collecting used paper from the customer and in response to a determination that a used-paper collection box provided to the customer is filled with used paper.

2. A method of receiving and handling an order from a customer using an order-reception system which is comprised of at least one computer and has an order-reception subsystem, business management subsystem and order-entry subsystem, comprising the steps of:

registering, by the order-entry subsystem, user information designating a user having filled in an application form, into a database of the business management system with a flag indicating membership of the user;

registering, by the order-entry subsystem, price information designating a price of a commodity, in a database of the business management system;

registering, by the order-reception subsystem, sales-promotion information to be displayed as sales-promotion materials and inquiry information to be displayed as Question and Answer (Q&A) information;

storing, in a sales-information database by the order-reception subsystem, Bulletin Board System information to be posted on a Bulletin Board System style page according to date and classification, the registered sales-promotion information to be displayed as sales-promotion materials according to date and classification, and the registered inquiry information to be displayed as the Q&A information according to date, context, and maker;

displaying, by the order-reception subsystem, the Bulletin Board System information on the Bulletin Board System style page;

displaying, by the order-reception subsystem, the sales-promotion materials;

receiving, by the order-reception subsystem, customer order information sent from the customer, said customer order information including customer information regarding the customer and at least one of ordering information representing contents of an order for a commodity ordered by the customer and support request information representing contents of a support request;

performing, by the order-reception subsystem, the order reception processing based on the received customer order information;

determining, by the order-reception subsystem, to deliver the commodity specified in the ordering information and to provide a support specified in the support information, based on a result of the order reception processing;

confirming, by the order-reception subsystem, whether the commodity is delivered and the support is provided; and charging, by the order-reception subsystem, a price of the commodity specified in the ordering information and a cost of the support specified in the support request information, based on the customer information including information regarding a price of each commodity purchased by the customer with high frequency and a cost of each support requested by the customer with high frequency, wherein the price and the cost are set by a seller of the commodity and support;

wherein the support request information includes information regarding a request for at least one of:
- a service for delivering the commodity to a place specified by the customer;
- a service for unpacking the ordered commodity at a time of delivery;
- a service for collecting an empty box that the customer does not need any more;
- a service for delivering commodities that are repeatedly supplied to the customer on a FIFO basis;
- a service for specifying a delivery date for delivering the commodity to be delivered;
- a service for urgently delivering the ordered commodity; and
- a service for periodically delivering a constant number of commodities specified by the customer;

the method further comprising the steps of:

in response to a determination to deliver the commodity specified in the ordering information, assigning, by the order-reception subsystem, a delivery of the commodity to a service person who can execute maintenance service for one of a plurality of apparatuses including office automation apparatuses, wherein the customer has made a contract of maintenance service for at least one of the plurality of office automation apparatuses; and determining, by the order-reception subsystem, to execute the maintenance service based on the contract of maintenance service at a time of delivering the commodity, based on the customer information and customer order information.

3. An order-reception system comprising:

an order-reception subsystem configured to receive customer order information sent from a customer, wherein the customer order information includes customer information regarding the customer and at least one of ordering information representing contents of an order for a commodity ordered by the customer and support request information representing contents of a support request;

a business management subsystem including a customer information database configured to store customer information regarding a price of a commodity purchased by the customer with high frequency and a cost of a support requested by the customer with high frequency, wherein the price and cost are set by a seller; and an order-entry subsystem configured to register user information designating a user having filled in an application form, into a database of the business management system with a flag indicating membership of the user, register price information designating a price of a commodity in the database of the business management system, and execute an order-reception processing based on the customer order information received by said order-reception subsystem;

wherein said order-reception subsystem is further configured to:

register sales-promotion information to be displayed as sales-promotion materials and inquiry information to be displayed as question and answer (Q&A) information;

store, in a sales-information database, Bulletin Board System information to be posted on a Bulletin Board System style page according to date and classification, the registered sales-promotion information to be displayed as sales-promotion materials according to date and classification, and the registered inquiry information to be displayed as the Q&A information according to date, context, and maker;

display the Bulletin Board System information on the Bulletin Board System style page;

display the sales-promotion materials;

determine to deliver the commodity specified in the ordering information and to provide the support specified in the support information, based on a result of the order reception processing;

confirm whether the ordered commodity is delivered and whether the support is provided; and charge the price of the commodity and the cost of the support specified in the ordering information; and wherein, the support request information includes information regarding a request for at least one of:

a service for delivering the commodity to a place specified by the customer;

a service for unpacking the ordered commodity at a time of delivering the ordered commodity ordered;

a service for collecting an empty box that the customer does not need any more;

a service for delivering commodities which are repeatedly supplied to the customer on a FIFO basis;

a service for specifying a delivery date for delivering the commodity to be delivered;

a service for urgently delivering the ordered commodity; and a service for periodically delivering a constant number of commodities specified by the customer, wherein said order-reception system is further comprised of a delivery subsystem configured to arrange collection of used paper, in response to a support request for collecting used paper from the customer and in response to a determination that a used-paper collection box provided to the customer is filled with used paper.

4. An order-reception system comprising:

an order-reception subsystem configured to receive customer order information sent from a customer, wherein the customer order information includes customer information regarding the customer and at least one of ordering information representing contents of an order for a commodity ordered by the customer and support request information representing contents of a support request;

a business management subsystem including a customer information database configured to store customer information regarding a price of a commodity purchased by the customer with high frequency and a cost of a support requested by the customer with high frequency, wherein the price and cost are set by a seller; and an order-entry subsystem configured to register user information designating a user having filled in an application form, into a database of the business management system with a flag indicating membership of the user, register price information designating a price of a commodity in the database of the business management system, and execute an order-reception processing based on the customer order information received by said order-reception subsystem;

wherein said order-reception subsystem is further configured to:

register sales-promotion information to be displayed as sales-promotion materials and inquiry information to be displayed as question and answer (Q&A) information;

store stores, in a sales-information database, Bulletin Board System information to be posted on a Bulletin Board System style page according to date and classification, the registered sales-promotion information to be displayed as sales-promotion materials according to date and classification, and the registered inquiry information to be displayed as the Q&A information according to date, context, and maker;

display the Bulletin Board System information on the Bulletin Board System style page;

display the sales-promotion materials;

determine to deliver the commodity specified in the ordering information and to provide the support specified in the support information, based on a result of the order reception processing;

confirm whether the ordered commodity is delivered and whether the support is provided; and charge the price of the commodity and the cost of the support specified in the ordering information;

assign, in response to a determination to deliver the commodity specified in the ordering information, a delivery of the commodity to a service person who can execute a maintenance service for one of a plurality of apparatuses including office automation apparatuses, wherein the customer has made a contract of maintenance service for at least one of the plurality of office automation apparatuses;

determine to execute the maintenance service based on the contract of maintenance service at a time of delivering the commodity, based on the customer information and customer order information;

wherein, the support request information includes information regarding a request for at least one of:

a service for delivering the commodity to a place specified by the customer;

a service for unpacking the ordered commodity at a time of delivering the ordered commodity ordered;

a service for collecting an empty box that the customer does not need any more;

a service for delivering commodities which are repeatedly supplied to the customer on a FIFO basis;

a service for specifying a delivery date for delivering the commodity to be delivered;

a service for urgently delivering the ordered commodity; and a service for periodically delivering a constant number of commodities specified by the customer.

* * * * *